United States Patent [19]
Takada

[11] Patent Number: 5,386,320
[45] Date of Patent: Jan. 31, 1995

[54] WIDE ANGLE ZOOM LENS SYSTEM

[75] Inventor: Katsuhiro Takada, Tokyo, Japan

[73] Assignee: Olympus Optical Co., Ltd., Tokyo, Japan

[21] Appl. No.: 975,015

[22] Filed: Nov. 12, 1992

[30] Foreign Application Priority Data

Nov. 13, 1991 [JP] Japan .................. 3-324062

[51] Int. Cl.⁶ .............................................. G02B 5/14
[52] U.S. Cl. .................... 359/689; 359/784
[58] Field of Search ............... 359/676, 677, 679, 680, 359/681, 682, 683, 684, 685, 686, 688, 689, 762, 781, 784, 765, 775, 760

[56] References Cited

U.S. PATENT DOCUMENTS

| | | | |
|---|---|---|---|
| 4,099,846 | 7/1978 | Kawamura et al. | 359/680 |
| 4,447,135 | 5/1984 | Nakamura | 359/680 |
| 4,540,249 | 9/1985 | Mogami | 359/680 |
| 4,591,244 | 5/1986 | Aono et al. | 359/688 |
| 4,634,237 | 1/1987 | Aono et al. | 359/688 |
| 4,948,239 | 8/1990 | Estelle | 359/688 |
| 5,000,550 | 3/1991 | Takahashi et al. | 359/680 |
| 5,159,493 | 10/1992 | Tsutsumi | 359/689 |
| 5,225,937 | 7/1993 | Horiuchi | 359/686 |
| 5,253,113 | 10/1993 | Sekita et al. | 359/682 |

FOREIGN PATENT DOCUMENTS

| | | |
|---|---|---|
| 60-130712 | 7/1985 | Japan . |
| 165113 | 6/1990 | Japan ...................... 359/688 |
| 2-296208 | 12/1990 | Japan . |

OTHER PUBLICATIONS

*Optik* vol. 64 No. 1 1983-K. Tanaka "Gausian Brackets and Their Application to Paraxial Theory. I. Gausian Brackets and Generalized Gausian Constants" pp. 13–24.

*Optik* vol. 64, No. 2 1983-K. Tanaka "Gausian Brackets and Their Application to Paraxial Theory. II. Paraxial Theory in Terms of Generalized Gausian Constants" pp. 89–111.

Primary Examiner—Anita Pellman Gross
Assistant Examiner—David R. Parsons
Attorney, Agent, or Firm—Cushman, Darby & Cushman

[57] ABSTRACT

A zoom lens system comprising, in order from the object side, a first lens unit having a negative refractive power as a whole, a second lens unit having a negative refractive power as a whole and a third lens unit having a positive refractive power as a whole. This zoom lens system has a very wide field angle of approximately 102° to 93°, a high aperture ratio of F/2.8 and a relatively simple composition.

12 Claims, 13 Drawing Sheets

WIDE ANGLE ZOOM LENS SYSTEM

BACKGROUND OF THE INVENTION

1. Field of the Invention

The present invention relates to a zoom lens system which has a super-wide field angle and is to be used in cameras, etc.

2. Description of the Prior Art

Most of the conventional wide angle zoom lens systems which are used in silver salt cameras, etc. have field angles on the order of 63° to 84° at wide positions of these zoom lens systems. Zoom lens systems having field angles larger than the order mentioned above exhibit remarkable effects for photographing even when the lens systems have low vari-focal ratios since these zoom lens systems allow variations of field angles which are large for variations of focal lengths thereof.

As a zoom lens system having a field angle which is large as described above, there is known the zoom lens system disclosed by Japanese Patent Kokai Publication No. Hei 2-296,208. This zoom lens system comprises, in order from the object side, a first lens unit having a negative refractive power, a second lens unit having a positive refractive power, a third lens unit having a negative refractive power and a fourth lens unit having a positive refractive power, and has a high aperture ratio of an F number of F/2.8. However, each of the lens units is composed of a large number of lens elements, and a lens element disposed at an object side location is an aspherical lens element, for correcting mainly distortion at the wide position, and can hardly be manufactured in practice.

Further, as a zoom lens system which has a simple composition, there is known the zoom lens system disclosed by Japanese Patent Kokai Publication No. Sho 60-130712. This zoom lens system has a simple composition consisting only of two lens units, i.e., a first lens unit having a negative refractive power and a second lens unit having a positive refractive power which are disposed in order from the object side. However, this zoom lens system allows an F number thereof to be varied by zooming and has an F number of F/3.5, or a low aperture ratio at a wide position thereof.

SUMMARY OF THE INVENTION

A primary object of the present invention is to provide a super-wide angle zoom lens system which has a very large field angle of approximately 102° to 93° at a wide position thereof, an F number of 2.8 or a high aperture ratio at the wide position and a relatively simple composition.

The zoom lens system according to the present invention comprises, in order from the object side, a first lens unit having a negative refractive power as a whole, a second lens unit having a negative refractive power as a whole and a third lens unit having a positive refractive power as a whole.

The zoom lens system according to the present invention is configured so as to perform zooming from the wide position to a tele position thereof by widening an airspace reserved between the first lens unit and the second lens unit and then narrowing this airspace, and narrowing an airspace reserved between the second lens unit and the third lens unit.

Further, in the zoom lens system according to the present invention, the first lens unit is kept fixed for zooming the lens system from the wide position to the tele position, but is moved for focusing the zoom lens system.

An ordinary zoom lens system which is disposed in a single lens reflex camera using silver salt films consists ordinarily of a first lens unit having a negative refractive power and a second lens unit having a positive refractive power, and is configured so as to perform zooming by varying an airspace reserved between these lens units.

A zoom lens system which is of the above-mentioned type and consists of the two lens units is optimum for use with single lens reflex cameras since this zoom lens system is of the so-called retrofocus type having negative-positive power distribution in order from the object side and can have a back focal length which is rather long for a focal length of the lens system.

In order to obtain a field angle of approximately 102° to 93° for in combination with a long back focal length with a compact size of the zoom lens system for accomplishing the object of the present invention, it is necessary to strengthen the refractive power of the first lens unit. When the refractive power of the first lens unit is strengthened, however, off-axial rays having large heights produce remarkable aberrations at the wide position of the zoom lens system.

It is originally difficult to correct offaxial aberrations in the retrofocus type lens system which has asymmetrical refractive power distribution, i.e., negative refractive power on the object side of an aperture stop and a positive refractive power on the image side of the aperture stop. For this reason, it is undesirable that the first lens unit having the negative refractive power produces remarkable offaxial aberrations. Further, strengthening the negative refractive power of the first lens unit allows remarkable spherical aberration to be produced by the first lens unit on which height of an axial ray is varied largely by zooming, whereby spherical aberration is varied remarkably by zooming. This tendency becomes more remarkable as the zoom lens system has a smaller F number or a higher aperture ratio, thereby making it difficult to enhance an aperture ratio of the zoom lens system consisting of the two lens units.

According to the present invention, aberrations can be corrected favorably even when the negative refractive power of the first lens unit is strengthened so as to widen the field angle and prolong the back focal length while maintaining the compact composition of the zoom lens system which consists of the first lens unit having the negative refractive power and the second lens unit having the positive refractive power. Speaking concretely with reference to the zoom lens system according to the present invention, the negative first lens unit, out of the two lens units of the zoom lens system consisting of the two lens units, is divided into a negative lens unit and another negative lens unit, whereby the zoom lens system according to the present invention consists of the three lens units.

When the lens unit having the negative refractive power is divided into the two lens units (the first lens unit and the second lens unit), it is possible to strengthen a total refractive power of these two lens units by controlling a distance as measured between principal points of these lens units without increasing aberrations to be produced by these lens units, thereby prolonging the back focal length and reduce the F number of the zoom lens system.

For the zoom lens system according to the present invention which has the composition described above, it is desirable to perform zooming by moving the first lens unit, the second lens unit and the third lens unit so that the airspace reserved between the first lens unit and the second lens unit is first widened and then narrowed, and the airspace reserved between the second lens unit and the third lens unit is narrowed.

When the lens units are moved as described above, the total negative refractive power of the first lens unit and the second lens unit is progressively strengthened as the lens system is zoomed from the wide position toward the tele position, becomes strongest in the vicinity of an intermediate focal length of the zoom lens system, and finally weakened at the tele position of the zoom lens system. Accordingly, it is possible to obtain a long back focal length of the zoom lens system by strengthening the total refractive power of the first lens unit and the second lens unit, and allow these lens units to produce offaxial aberrations at the wide position and spherical aberration at the tele position in small amounts by relatively weakening the total refractive power at the wide position and the tele-position.

It is desirable for the zoom lens system according to the present invention described above to satisfy the following conditions (1) and (2):

$$-3.0 < f_1/f_w < -1.0 \quad (1)$$

$$0.85 < f_2/f_1 \quad (2)$$

wherein the reference symbols $f_1$ and $f_2$ represent focal lengths of the first lens unit and the second lens unit respectively, and the reference symbol $f_W$ designates a focal length of the zoom lens system as a whole at the wide position thereof.

The condition (1) defines the focal length of the first lens unit. If the lower limit of the condition (1) is exceeded, the first lens unit will have too weak a refractive power, whereby the axial ray will have a low height on the image side surface of the second lens unit and it will be difficult to obtain the required back focal length. Further, the zoom lens system will have an entrance pupil located nearer an image surface thereof, whereby the first lens unit will have a larger outside diameter and a filter must have a large diameter in the zoom lens system. Furthermore, Petzval's sum will be aggravated and remarkable curvature of field will be produced especially at the tele position. If the upper limit of the condition (1) is exceeded, in contrast, the first lens unit will have too strong a refractive power, whereby the axial ray will have a large height on the image side of the second lens unit and spherical aberration of high order will be produced remarkably on the negative side within a region from the intermediate focal length to the tele position. Simultaneously, astigmatism will be remarkable at a marginal portion of an image at the wide position and an image will be disturbed when it is defocused.

The condition (2) defines a refractive power distribution between the first lens unit and the second lens unit to which the negative refractive power of the zoom lens system is imparted. If the lower limit of the condition (2) is exceeded, a large share of the negative refractive power is imparted to the second lens unit, thereby shortening the distance as measured from the principal point of the total system consisting of the first lens unit and the second lens unit to the principal point of the third lens unit, and weakening the refractive power of the zoom lens system as a whole. Accordingly, it is necessary to strengthen the refractive power of the third lens unit for obtaining the required refractive power of the zoom lens system without prolonging a total length of the zoom lens system, thereby aggravating curvature of field as well as spherical aberration at the tele position.

In the zoom lens system which consists of the two lens units and moves the first lens unit for zooming, the first lens unit adopted as the movable lens unit is displaced forward for focusing. For this reason, this zoom lens system must use a complicated mechanism for moving this lens unit. In order to simplify the mechanism for moving the lens unit, it is desirable that the first lens unit is kept fixed for zooming the lens system from the wide position to the tele position.

In case of the zoom lens system which consists of the two lens units, let us examine a condition which is required for equalizing the total length (a distance as measured from the first lens surface to the image surface) of the zoom lens system at two different focal lengths. Since the first lens unit is moved so as to shorten and then prolong a distance as measured from this lens unit to the image surface for zooming the lens system from the wide position to the tele position, the total length of the zoom lens system is equal only at two focal lengths within a zooming range thereof. In case of the zoom lens system consisting of the two lens units mentioned above, it will be described more detailedly below. When the refractive power of the first lens unit is represented by $\phi_1$, the refractive power of the second lens unit is designated by $\phi_2$, an airspace reserved between the first lens unit and the second lens unit at a standard focal length is denoted by $e_1$ and the distance as measured from the second lens unit to the image surface is represented by $e_2$, a variation x of the airspace reserved between the first lens unit and the second lens unit, which is caused by varying from the standard focal length of the zoom lens system to another focal length at which the zoom lens system has the total length equal to that at the standard focal length, is expressed by the following formula (i):

$$x = \frac{1}{\phi_1} - (e_1 - e_2)$$

Further, a ratio $\beta$ between a magnification at the standard focal length of the zoom-lens system and a magnification at an optional zoomed position is given by the following formula (ii):

$$\beta = (\phi_s/\phi_1)^2$$

wherein the reference symbol $\phi_s$ represents a refractive power of the zoom lens system at the zoomed position taken as the standard.

As is understood from the formula (ii), the ratio between the magnifications at the two zoomed positions at which the zoom lens system has the equal total length is determined dependently on the refractive power $\phi_s$ of the zoom lens system as a whole at the standard zoomed position and the refractive power $\phi_1$ of the first lens unit, and independent of the refractive power $\phi_2$ of the second lens unit and the variation x.

Since the airspace reserved between the first lens unit and the second lens unit is once increased and then decreased, and the airspace reserved between the second lens unit and the third lens unit is decreased for zooming the zoom lens system according to the present invention, it is possible that the total length of the zoom lens system at the wide position is equal to that of the zoom lens system at the tele position.

The total length of the zoom lens system at the wide position can be equalized to that of the zoom lens system at the tele position by equalizing the airspace reserved between the first lens unit and the second lens unit at the wide position to that at the tele position, selecting a total focal length of the first lens unit and the second lens unit at the wide position and tele position, a total refractive power of the first lens unit and the second lens unit at the wide position and the above-mentioned ratio between the magnification so as to satisfy the formula (ii), and selecting the positional relationship between the third lens unit and the image surface so as to satisfy the formula (i). Further, it is possible to maintain the total length of the zoom lens system constant by determining $e_1$ and $e_2$ so as to satisfy the following formula (iii):

$$^1C_3 = \phi e_1 - e_2 + {}^1A_3/\phi = TL \qquad (iii)$$

wherein the reference symbols $^1A_3$ and $^1C_3$ represent paraxial values expressed by the following formulae using Gaussian bracket which is used for paraxial analysis of the zoom lens system published, for example, on pages 13 to 24, Vol. 64, No. 1 and on pages 92 to 111, Vol. 64, No. 2, in "Optik".

$$^1A_3 = [\phi_1, -e_1, \phi_2, -e_2]$$

$$^1C_3 = [\phi_1, -e_1, \phi_2, -e_2, \phi_3]$$

wherein the reference symbols $\phi_1$, $\phi_2$ and $\phi_3$ represent refractive powers of the first lens unit, the second lens unit and the third lens unit respectively, the reference symbols $e_1$ designates the airspace reserved between the first lens unit and the second lens unit, the reference symbol $e_2$ denotes the airspace reserved between the second lens unit and the third lens unit, the reference symbol $\phi$ represents the refractive power of the zoom lens system as a whole, and the reference symbol TL designates the total length of the zoom lens system as a whole which is to be maintained constant.

Though the ratio between the magnification at the standard zoomed position and the magnification at an optional zoomed position which is represented by $\beta$ in the formula (ii) is coincident with the ratio between the magnification at the wide position and that at the tele position of the zoom lens system in the description made above, these ratios need not be coincident with each other. The total length of the zoom lens system according to the present invention can be shortened by setting the ratio represented by $\beta$ in the formula (ii) at a value smaller than the ratio between the magnifications at the wide position and the tele position, and by using the formulae (i) and (ii) so that the zoom lens system according to the present invention has a total length which is the same at two intermediate focal lengths. Further, the total length of the zoom lens system according to the present invention may be equal within an imaginary zooming range broader than that from the wide position to the tele position, or with an enlarged value of B in the formula (ii).

The total length of the zoom lens system according to the present invention can be kept unchanged by zooming, or by moving the lens units as described above i.e., by varying the airspace reserved between the first lens unit and the second lens unit, with the first lens unit kept fixed, so as to be once widened and then narrowed, and narrowing the airspace reserved between the second lens unit and the third lens unit.

Furthermore, when the first lens unit is kept fixed for zooming the zoom lens system according to the present invention from the wide position to the tele position thereof, it is desirable that the following condition (2') is satisfied.

$$0.85 < f_2/f_1 < 3.5 \qquad (2')$$

The condition (2') defines an upper limit for the above-mentioned condition (2).

Focal length of the zoom lens system according to the present invention is varied from the wide position to the tele position mainly by moving the third lens unit, whereas the second lens unit has a role of a compensator which serves for forming an image at a predetermined location while maintaining constant the total length of the zoom lens system. If the upper limit of the condition (2') is exceeded, the second lens unit will have too weak a refractive power, whereby the second lens unit must be moved for a long distance for performing the role of the compensator and, since the first lens unit is kept fixed, the second lens unit may strike against the first lens unit or the third lens unit. Further, when the first lens unit has the required negative refractive power, negative refractive power will be excessive for the zoom lens system at the wide position and the tele position, thereby aggravating coma and curvature of field of high order at the wide position as well as spherical aberration at the tele position.

DETAILED DESCRIPTION OF THE PREFERRED EMBODIMENTS

Figure 1:
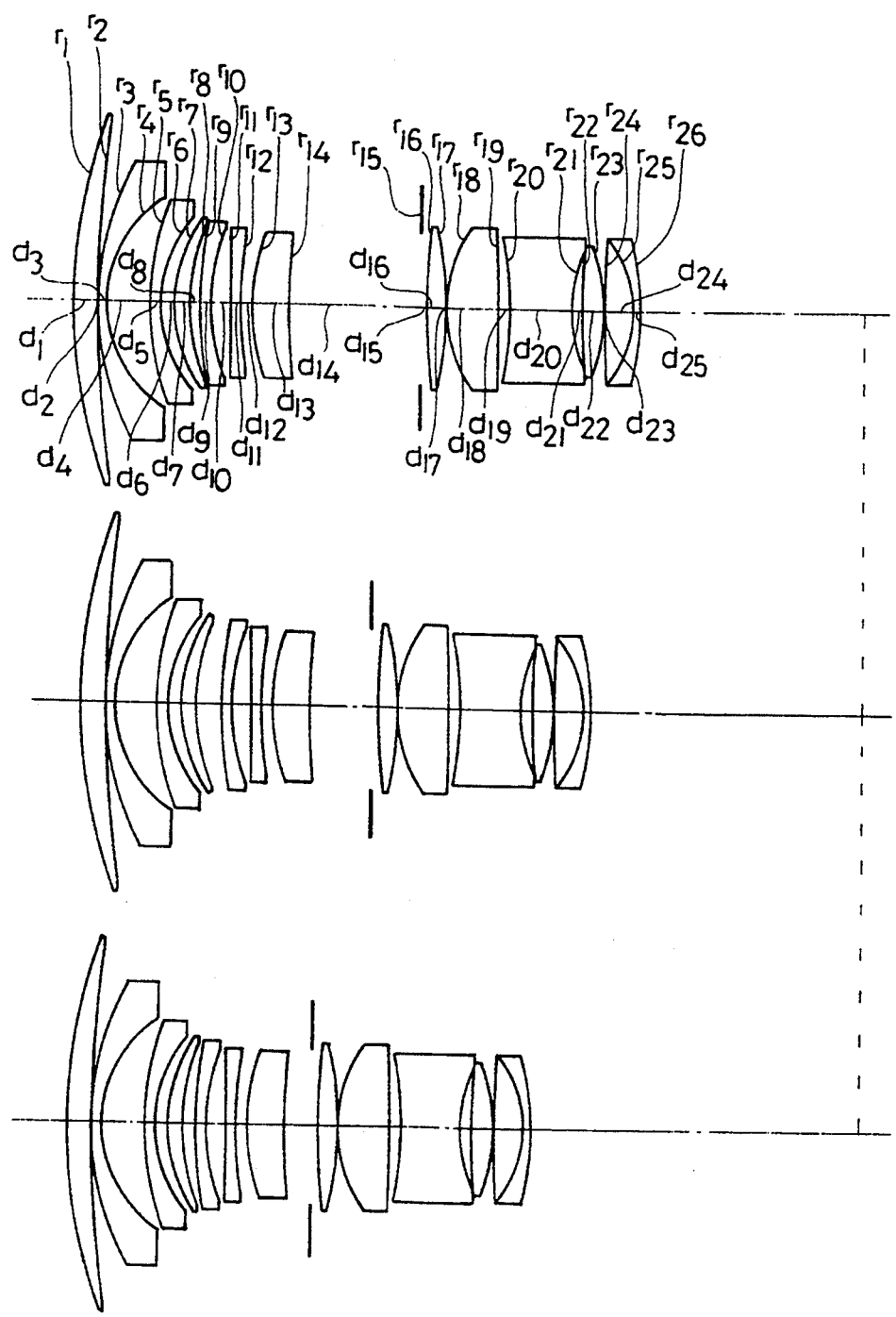
FIG. 1 through FIG. 5 show sectional views illustrating compositions of a first embodiment through a fifth embodiment of the zoom lens system according to the present invention.

Now, the zoom lens system according to the present invention will be described more detailedly below with reference to the embodiments shown in the accompanying drawings and given in the form of the following numerical data:

Embodiment 1

$f = 21.0 \sim 27.1 \sim 35.0$, F/2.8,
$2\omega = 93.8° \sim 78.9° \sim 64.3°$
Maximum image height = 21.6

$r_1 = 86.4444$
$\quad d_1 = 3.8000 \quad n_1 = 1.88300 \quad \nu_1 = 40.78$
$r_2 = 180.1639$
$\quad d_2 = 0.1000$
$r_3 = 46.6046$
$\quad d_3 = 1.7000 \quad n_2 = 1.78650 \quad \nu_2 = 50.00$
$r_4 = 19.8283$
$\quad d_4 = 7.0361$
$r_5 = 46.5702$
$\quad d_5 = 1.7000 \quad n_3 = 1.86300 \quad \nu_3 = 41.53$
$r_6 = 20.9520$
$\quad d_6 = 2.3130$
$r_7 = 25.0733$
$\quad d_7 = 2.4115 \quad n_4 = 1.56907 \quad \nu_4 = 71.30$
$r_8 = 33.2930$
$\quad d_8 = D_1$ (variable)
$r_9 = 66.3860$
$\quad d_9 = 1.7000 \quad n_5 = 1.69680 \quad \nu_5 = 56.49$
$r_{10} = 32.0205$
$\quad d_{10} = 3.2307$
$r_{11} = -1267.2628$
$\quad d_{11} = 1.7000 \quad n_6 = 1.75500 \quad \nu_6 = 52.33$
$r_{12} = 78.0329$
$\quad d_{12} = 1.7763$
$r_{13} = 34.5004$
$\quad d_{13} = 6.1221 \quad n_7 = 1.74000 \quad \nu_7 = 28.29$
$r_{14} = 170.7882$
$\quad d_{14} = D_2$ (variable)
$r_{15} =$ (stop)
$\quad d_{15} = 1.0000$
$r_{16} = 120.5823$
$\quad d_{16} = 3.2337 \quad n_8 = 1.65830 \quad \nu_8 = 57.33$
$r_{17} = -56.8606$
$\quad d_{17} = 0.1000$
$r_{18} = 24.0524$
$\quad d_{18} = 8.4569 \quad n_9 = 1.58313 \quad \nu_9 = 59.36$
$r_{19} = -485.3604$
$\quad d_{19} = 1.7654$
$r_{20} = -62.6992$
$\quad d_{20} = 10.2366 \quad n_{10} = 1.87400 \quad \nu_{10} = 35.26$
$r_{21} = 27.4026$
$\quad d_{21} = 1.5978$
$r_{22} = 107.1156$
$\quad d_{22} = 3.3900 \quad n_{11} = 1.60300 \quad \nu_{11} = 65.48$ -continued $f = 21.0 \sim 27.1 \sim 35.0$, F/2.8,
$2\omega = 93.8° \sim 78.9° \sim 64.3°$
Maximum image height = 21.6

$r_{23} = -31.7322$
$\quad d_{23} = 0.1000$
$r_{24} = 245.6256$
$\quad d_{24} = 5.0149 \quad n_{12} = 1.60311 \quad \nu_{12} = 60.70$
$r_{25} = -18.1913$
$\quad d_{25} = 1.2000 \quad n_{13} = 1.83400 \quad \nu_{13} = 37.16$
$r_{26} = -41.4847$

| f | 21.0 | 27.1 | 35.0 |
|---|---|---|---|
| $D_1$ | 1.688 | 3.970 | 2.073 |
| $D_2$ | 21.752 | 10.126 | 4.533 |

(back focal length at wide position) = 36.99
$f_1/f_W = -1.40$, $f_2/f_1 = 10.46$

Embodiment 2

$f = 21.1 \sim 27.1 \sim 35.0$, F/2.8,
$2\omega = 93.7° \sim 79.0° \sim 64.4°$
Maximum image height = 21.6

$r_1 = 95.9126$
$\quad d_1 = 3.8000 \quad n_1 = 1.78590 \quad \nu_1 = 44.18$
$r_2 = 224.8900$
$\quad d_2 = 0.1000$
$r_3 = 46.6171$
$\quad d_3 = 1.7000 \quad n_2 = 1.77250 \quad \nu_2 = 49.66$
$r_4 = 19.4539$
$\quad d_4 = 7.2070$
$r_5 = 48.5366$
$\quad d_5 = 1.7000 \quad n_3 = 1.79952 \quad \nu_3 = 42.24$
$r_6 = 20.9961$
$\quad d_6 = 2.4537$
$r_7 = 22.0887$
$\quad d_7 = 3.2289 \quad n_4 = 1.56907 \quad \nu_4 = 71.30$
$r_8 = 36.4316$
$\quad d_8 = D_1$ (variable)
$r_9 = 52.4669$
$\quad d_9 = 1.7000 \quad n_5 = 1.69680 \quad \nu_5 = 56.49$
$r_{10} = 26.7823$
$\quad d_{10} = 3.2528$
$r_{11} = -193.8793$
$\quad d_{11} = 1.7000 \quad n_6 = 1.74100 \quad \nu_6 = 52.68$
$r_{12} = 61.9270$
$\quad d_{12} = 1.6918$
$r_{13} = 36.3936$
$\quad d_{13} = 4.6034 \quad n_7 = 1.74000 \quad \nu_7 = 28.29$
$r_{14} = \infty$
$\quad d_{14} = D_2$ (variable)
$r_{15} =$ (stop)
$\quad d_{15} = 1.0000$
$r_{16} = 120.7095$
$\quad d_{16} = 3.2775 \quad n_8 = 1.65830 \quad \nu_8 = 57.33$
$r_{17} = -57.2650$
$\quad d_{17} = 0.1000$
$r_{18} = 23.8626$
$\quad d_{18} = 8.4632 \quad n_9 = 1.58313 \quad \nu_9 = 59.36$
$r_{19} = \infty$
$\quad d_{19} = 1.9309$
$r_{20} = -61.1898$
$\quad d_{20} = 9.3833 \quad n_{10} = 1.85026 \quad \nu_{10} = 32.28$
$r_{21} = 26.7516$
$\quad d_{21} = 1.7441$
$r_{22} = 138.3378$
$\quad d_{22} = 3.1011 \quad n_{11} = 1.60300 \quad \nu_{11} = 65.48$
$r_{23} = -34.2521$
$\quad d_{23} = 0.1000$
$r_{24} = 237.8382$
$\quad d_{24} = 4.8833 \quad n_{12} = 1.60311 \quad \nu_{12} = 60.70$
$r_{25} = -18.5954$
$\quad d_{25} = 1.2000 \quad n_{13} = 1.83400 \quad \nu_{13} = 37.16$
$r_{26} = -36.7264$

| f | 21.1 | 27.1 | 35.0 |
|---|---|---|---|
| $D_1$ | 1.303 | 4.593 | 1.580 |
| $D_2$ | 21.989 | 9.478 | 4.248 |

(back focal length at wide position) = 36.98
$f_1/f_W = -1.64$, $f_2/f_1 = 4.53$

Embodiment 3

$f = 18.1 \sim 25.1 \sim 35.0$, $F/2.8 \sim 3.1 \sim 3.5$
$2\omega = 102.3° \sim 83.2° \sim 64.4°$,
maximum image height = 21.6

| | | | |
|---|---|---|---|
| $r_1 = 93.0056$ | | | |
| | $d_1 = 4.7561$ | $n_1 = 1.83481$ | $\nu_1 = 42.72$ |
| $r_2 = 175.9624$ | | | |
| | $d_2 = 0.1000$ | | |
| $r_3 = 38.3566$ | | | |
| | $d_3 = 1.7000$ | $n_2 = 1.78650$ | $\nu_2 = 50.00$ |
| $r_4 = 20.9081$ | | | |
| | $d_4 = 7.6423$ | | |
| $r_5 = 39.3769$ | | | |
| | $d_5 = 1.7000$ | $n_3 = 1.88300$ | $\nu_3\ 40.78$ |
| $r_6 = 20.4097$ | | | |
| | $d_6 = 2.4594$ | | |
| $r_7 = 26.3856$ | | | |
| | $d_7 = 2.1099$ | $n_4 = 1.56883$ | $\nu_4 = 56.34$ |
| $r_8 = 26.2092$ | | | |
| | $d_8 = D_1$ (variable) | | |
| $r_9 = 37.1111$ | | | |
| | $d_9 = 1.7000$ | $n_5 = 1.69680$ | $\nu_5 = 56.49$ |
| $r_{10} = 22.0713$ | | | |
| | $d_{10} = 3.5133$ | | |
| $r_{11} = 453.9855$ | | | |
| | $d_{11} = 1.7000$ | $n_6 = 1.72916$ | $\nu_6 = 54.68$ |
| $r_{12} = 41.3121$ | | | |
| | $d_{12} = 1.9821$ | | |
| $r_{13} = 27.0662$ | | | |
| | $d_{13} = 2.9122$ | $n_7 = 1.72151$ | $\nu_7 = 29.24$ |
| $r_{14} = 104.5780$ | | | |
| | $d_{14} = D_2$ (variable) | | |
| $r_{15} = $ (stop) | | | |
| | $d_{15} = 1.0000$ | | |
| $r_{16} = 160.9400$ | | | |
| | $d_{16} = 2.6725$ | $n_8 = 1.65100$ | $\nu_8 = 56.15$ |
| $r_{17} = -53.9781$ | | | |
| | $d_{17} = 0.1000$ | | |
| $r_{18} = 22.7165$ | | | |
| | $d_{18} = 8.7735$ | $n_9 = 1.57444$ | $\nu_9 = 56.47$ |
| $r_{19} = -72.5208$ | | | |
| | $d_{19} = 1.4304$ | | |
| $r_{20} = -34.7058$ | | | |
| | $d_{20} = 7.5001$ | $n_{10} = 1.87400$ | $\nu_{10} = 35.26$ |
| $r_{21} = 30.1152$ | | | |
| | $d_{21} = 1.5034$ | | |
| $r_{22} = \infty$ | | | |
| | $d_{22} = 3.0262$ | $n_{11} = 1.56907$ | $\nu_{11} = 71.30$ |
| $r_{23} = -25.3684$ | | | |
| | $d_{23} = 0.1000$ | | |
| $r_{24} = 523.0739$ | | | |
| | $d_{24} = 5.1020$ | $n_{12} = 1.61700$ | $\nu_{12} = 62.79$ |
| $r_{25} = -17.4575$ | | | |
| | $d_{25} = 1.2000$ | $n_{13} = 1.83400$ | $\nu_{13} = 37.16$ |
| $r_{26} = -29.9669$ | | | |

| f | 18.1 | 25.1 | 35.0 |
|---|---|---|---|
| $D_1$ | 2.506 | 4.935 | 1.500 |
| $D_2$ | 23.034 | 9.380 | 3.607 |

(back focal length at wide position) = 36.94
$f_1/f_W = -1.67$, $f_2/f_1 = 4.58$

Embodiment 4

$f = 21.0 \sim 27.1 \sim 35.0$, $F/2.8$,
$2\omega = 93.8° \sim 78.9° \sim 64.5°$
Maximum image height = 21.6

| | | | |
|---|---|---|---|
| $r_1 = 97.1844$ | | | |
| | $d_1 = 3.8000$ | $n_1 = 1.88300$ | $\nu_1 = 40.78$ |
| $r_2 = 215.7766$ | | | |
| | $d_2 = 0.1000$ | | |
| $r_3 = 50.2047$ | | | |
| | $d_3 = 1.7000$ | $n_2 = 1.78650$ | $\nu_2 = 50.00$ |
| $r_4 = 19.6623$ | | | |
| | $d_4 = 7.1994$ | | |
| $r_5 = 46.4736$ | | | |
| | $d_5 = 1.7000$ | $n_3 = 1.86300$ | $\nu_3 = 41.53$ |
| $r_6 = 24.6785$ | | | |
| | $d_6 = 2.4561$ | | |
| $r_7 = 23.2170$ | | | |
| | $d_7 = 3.2571$ | $n_4 = 1.56907$ | $\nu_4 = 71.30$ |
| $r_8 = 36.6405$ | | | |
| | $d_8 = D_1$ (variable) | | |
| $r_9 = 61.9348$ | | | |
| | $d_9 = 1.7000$ | $n_5 = 1.69680$ | $\nu_5 = 56.49$ |
| $r_{10} = 23.0302$ | | | |
| | $d_{10} = 3.3336$ | | |
| $r_{11} = 428.9358$ | | | |
| | $d_{11} = 1.7000$ | $n_6 = 1.75500$ | $\nu_6 = 52.33$ |
| $r_{12} = 58.7548$ | | | |
| | $d_{12} = 1.9300$ | | |
| $r_{13} = 32.0759$ | | | |
| | $d_{13} = 4.9938$ | $n_7 = 1.74000$ | $\nu_7 = 28.29$ |
| $r_{14} = 156.5435$ | | | |
| | $d_{14} = D_2$ (variable) | | |
| $r_{15} = $ (stop) | | | |
| | $d_{15} = 1.0000$ | | |
| $r_{16} = 106.1486$ | | | |
| | $d_{16} = 3.1855$ | $n_8 = 1.65830$ | $\nu_8 = 57.33$ |
| $r_{17} = -62.7322$ | | | |
| | $d_{17} = 0.1000$ | | |
| $r_{18} = 22.7957$ | | | |
| | $d_{18} = 8.1769$ | $n_9 = 1.58313$ | $\nu_9 = 59.36$ |
| $r_{19} = -137.6814$ | | | |
| | $d_{19} = 1.8502$ | | |
| $r_{20} = -52.9895$ | | | |
| | $d_{20} = 8.3404$ | $n_{10} = 1.87400$ | $\nu_{10} = 35.26$ |
| $r_{21} = 25.4751$ | | | |
| | $d_{21} = 1.8087$ | | |
| $r_{22} = 113.1350$ | | | |
| | $d_{22} = 3.4055$ | $n_{11} = 1.60300$ | $\nu_{11} = 65.48$ |
| $r_{23} = -31.0102$ | | | |
| | $d_{23} = 0.1000$ | | |
| $r_{24} = 434.7946$ | | | |
| | $d_{24} = 4.9740$ | $n_{12} = 1.60311$ | $\nu_{12} = 60.70$ |
| $r_{25} = -17.9517$ | | | |
| | $d_{25} = 1.2000$ | $n_{13} = 1.83400$ | $\nu_{13} = 37.16$ |
| $r_{26} = -38.1831$ | | | |

| f | 21.0 | 27.1 | 35.0 |
|---|---|---|---|
| $D_1$ | 1.500 | 5.349 | 1.500 |
| $D_2$ | 21.372 | 9.396 | 4.782 |

(back focal length at wide position) = 36.94
$f_1/f_W = -1.86$, $f_2/f_1 = 2.57$

Embodiment 5

$f = 21.1 \sim 27.1 \sim 35.0$, $F/2.8$,
$2\omega = 93.8° \sim 78.8° \sim 64.5°$
maximum image height = 21.6

| | | | |
|---|---|---|---|
| $r_1 = 111.8232$ | | | |
| | $d_1 = 3.8000$ | $n_1 = 1.88300$ | $\nu_1 = 40.78$ |
| $r_2 = 265.0478$ | | | |
| | $d_2 = 0.1000$ | | |
| $r_3 = 54.3252$ | | | |
| | $d_3 = 1.7000$ | $n_2 = 1.78650$ | $\nu_2 = 50.00$ |
| $r_4 = 22.1085$ | | | |
| | $d_4 = 6.0262$ | | |
| $r_5 = 61.9112$ | | | |
| | $d_5 = 1.7000$ | $n_3 = 1.86300$ | $\nu_3 = 41.53$ |
| $r_6 = 35.2817$ | | | |
| | $d_6 = 0.6585$ | | |
| $r_7 = 42.8591$ | | | |
| | $d_7 = 2.9168$ | $n_4 = 1.56907$ | $\nu_4 = 71.30$ |
| $r_8 = 143.3148$ | | | |
| | $d_8 = D_1$ (variable) | | |
| $r_9 = 69.7418$ | | | |
| | $d_9 = 1.7000$ | $n_5 = 1.69680$ | $\nu_5 = 56.49$ |
| $r_{10} = 19.3825$ | | | |
| | $d_{10} = 3.8734$ | | |
| $r_{11} = 266.1766$ | | | |
| | $d_{11} = 1.7000$ | $n_6 = 1.75500$ | $\nu_6 = 52.33$ |
| $r_{12} = 46.0754$ | | | |
| | $d_{12} = 2.4958$ | | |

-continued $f = 21.1 \sim 27.1 \sim 35.0, F/2.8,$
$2\omega = 93.8° \sim 78.8° \sim 64.5°$
maximum image height = 21.6

| | | | |
|---|---|---|---|
| $r_{13} = 29.5014$ | | | |
| | $d_{13} = 6.6810$ | $n_7 = 1.7400$ | $v_7 = 28.29$ |
| $r_{14} = 116.9584$ | | | |
| | $d_{14} = D_2$ (variable) | | |
| $r_{15} = $ (stop) | | | |
| | $d_{15} = 1.0000$ | | |
| $r_{16} = 191.2390$ | | | |
| | $d_{16} = 3.0844$ | $n_8 = 1.65830$ | $v_8 = 57.33$ |
| $r_{17} = -52.9695$ | | | |
| | $d_{17} = 0.1000$ | | |
| $r_{18} = 21.2825$ | | | |
| | $d_{18} = 8.4805$ | $n_9 = 1.58313$ | $v_9 = 59.36$ |
| $r_{19} = -85.0492$ | | | |
| | $d_{19} = 1.4981$ | | |
| $r_{20} = -43.4697$ | | | |
| | $d_{20} = 7.5000$ | $n_{10} = 1.87400$ | $v_{10} = 35.26$ |
| $r_{21} = 24.8478$ | | | |
| | $d_{21} = 1.9769$ | | |
| $r_{22} = 148.0842$ | | | |
| | $d_{22} = 3.4843$ | $n_{11} = 1.60300$ | $v_{11} = 65.48$ |
| $r_{23} = -28.2615$ | | | |
| | $d_{23} = 0.1000$ | | |
| $r_{24} = 783.6786$ | | | |
| | $d_{24} = 4.6057$ | $n_{12} = 1.60311$ | $v_{12} = 60.70$ |
| $r_{25} = -19.1652$ | | | |
| | $d_{25} = 1.2000$ | $n_{13} = 1.83400$ | $v_{13} = 37.16$ |
| $r_{26} = -37.8748$ | | | |

| f | 21.1 | 27.1 | 35.0 |
|---|---|---|---|
| $D_1$ | 1.500 | 4.057 | 1.500 |
| $D_2$ | 20.865 | 10.535 | 4.541 |

(back focal length at wide position) = 36.99
$f_1/f_W = -2.84, f_2/f_1 = 0.92$ wherein the reference symbols $r_1, r_2, \ldots$ represent radii of curvature on respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's numbers of-the respective lens elements.

The first embodiment has a composition illustrated in FIG. 1, wherein the zoom lens system comprises, in order from the object side, a first lens unit having a negative refractive power, a second lens unit having a negative refractive power and a third lens unit having a positive refractive power. This zoom lens system is configured so as to be zoomed from the wide position to the tele position by moving the first lens unit, the second lens unit and the third lens unit so that an airspace reserved between the first lens unit and the second lens unit is once widened and then narrowed, and an airspace reserved between the second lens unit and the third lens unit is narrowed.

Further, the first lens unit consists, in order from the object side, of a positive meniscus lens component having a convex surface on the object side, a negative meniscus lens component having a convex surface on the object side, a negative meniscus lens component having a convex surface on the object side and a positive meniscus lens component having a convex surface on the object side; the second lens unit consists, in order from the object side, of a negative meniscus lens component having a convex surface on the object side, a biconcave lens component and a positive meniscus lens component having a convex surface on the object side; and the third lens unit consists, in order from the object side, of an aperture stop, a biconvex lens component, a biconvex lens component, a biconcave lens component, a biconvex lens component, and a biconvex cemented doublet consisting of a biconvex lens element and a negative meniscus lens element.

The first embodiment has the composition described above, is zoomed by moving the lens units as described above, features a large F number of 2.8 and has a long back focal length.

Figure 6:
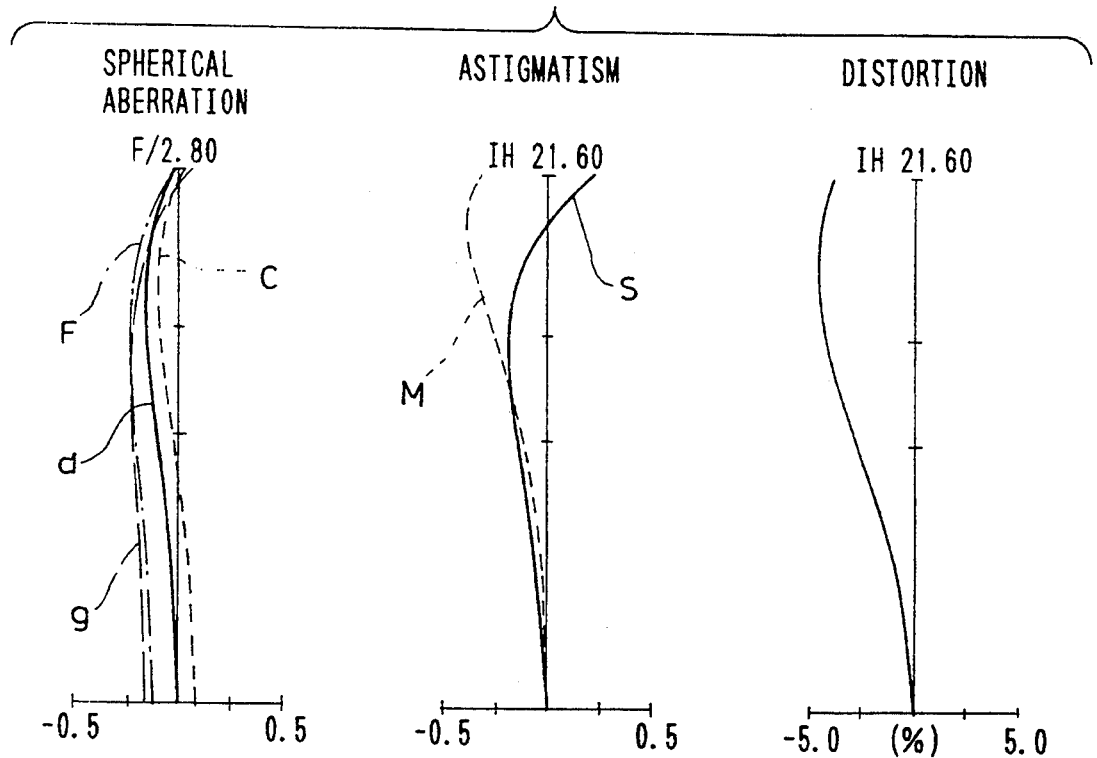
FIG. 6 shows graphs illustrating aberration characteristics at the wide position of the first embodiment.
Figure 7:
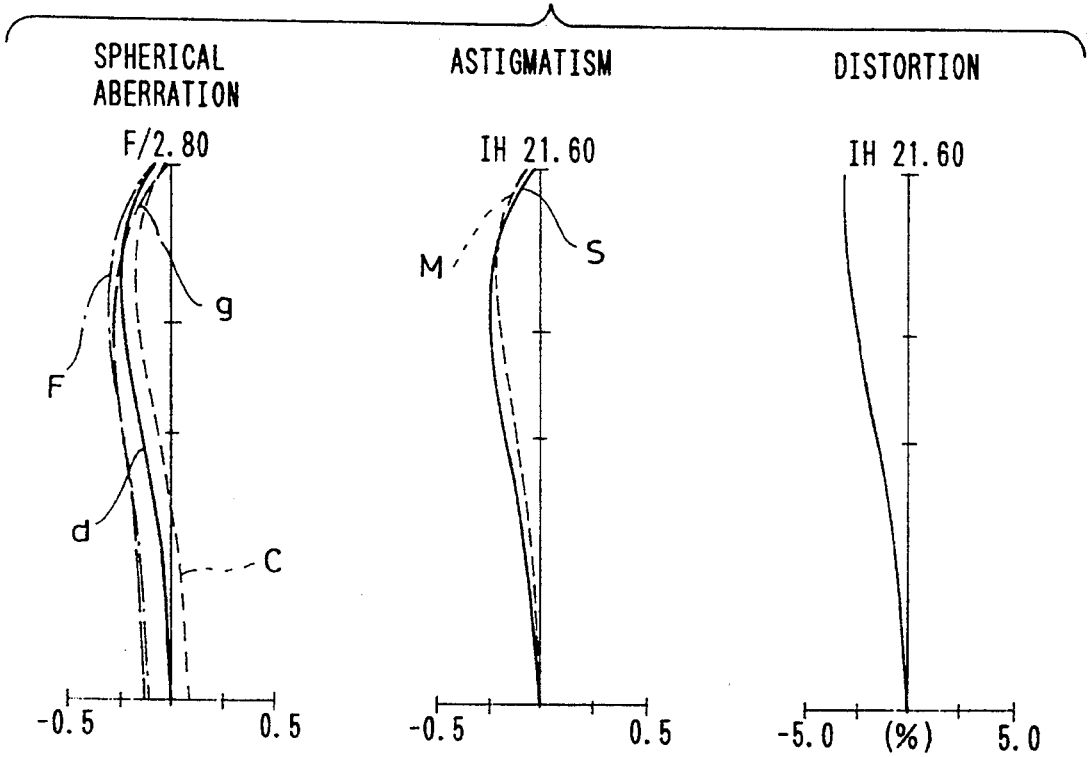
FIG. 7 shows graphs illustrating aberration characteristics at the intermediate focal length of the first embodiment of the present invention.
Figure 8:
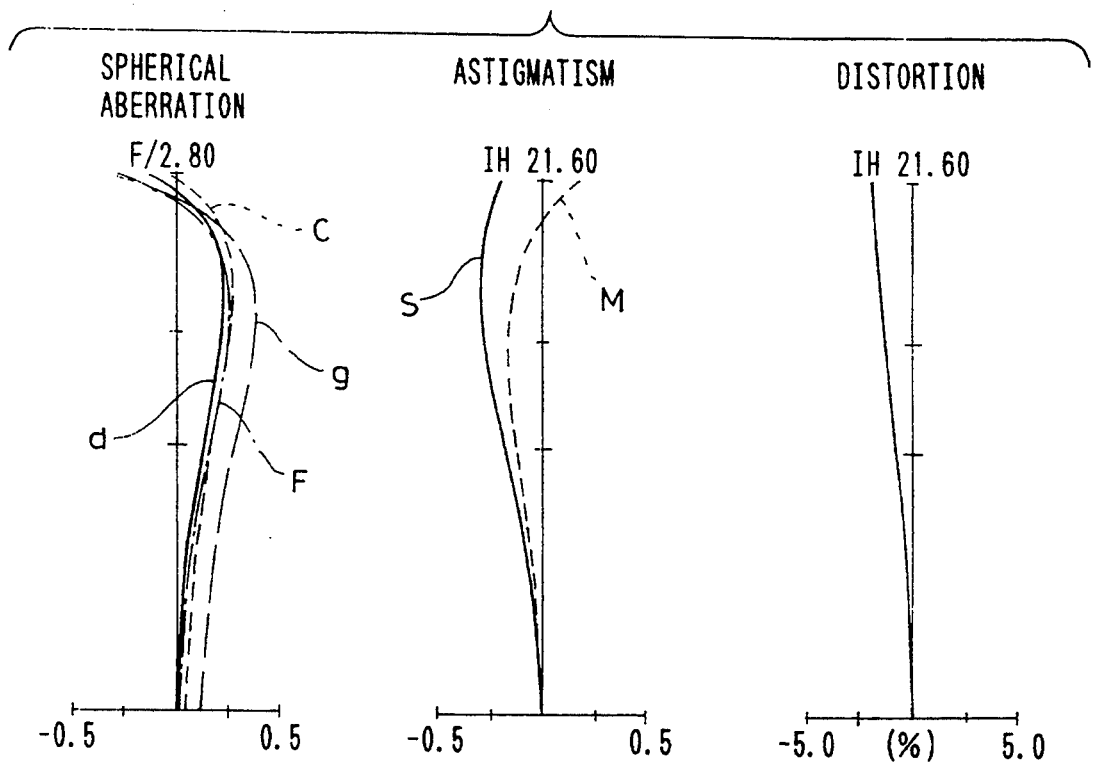
FIG. 8 shows graphs illustrating aberration characteristics at the tele position of the first embodiment of the present invention.

The first embodiment has aberrations which are corrected favorably as illustrated in FIG. 6 through FIG. 8.

Figure 2:
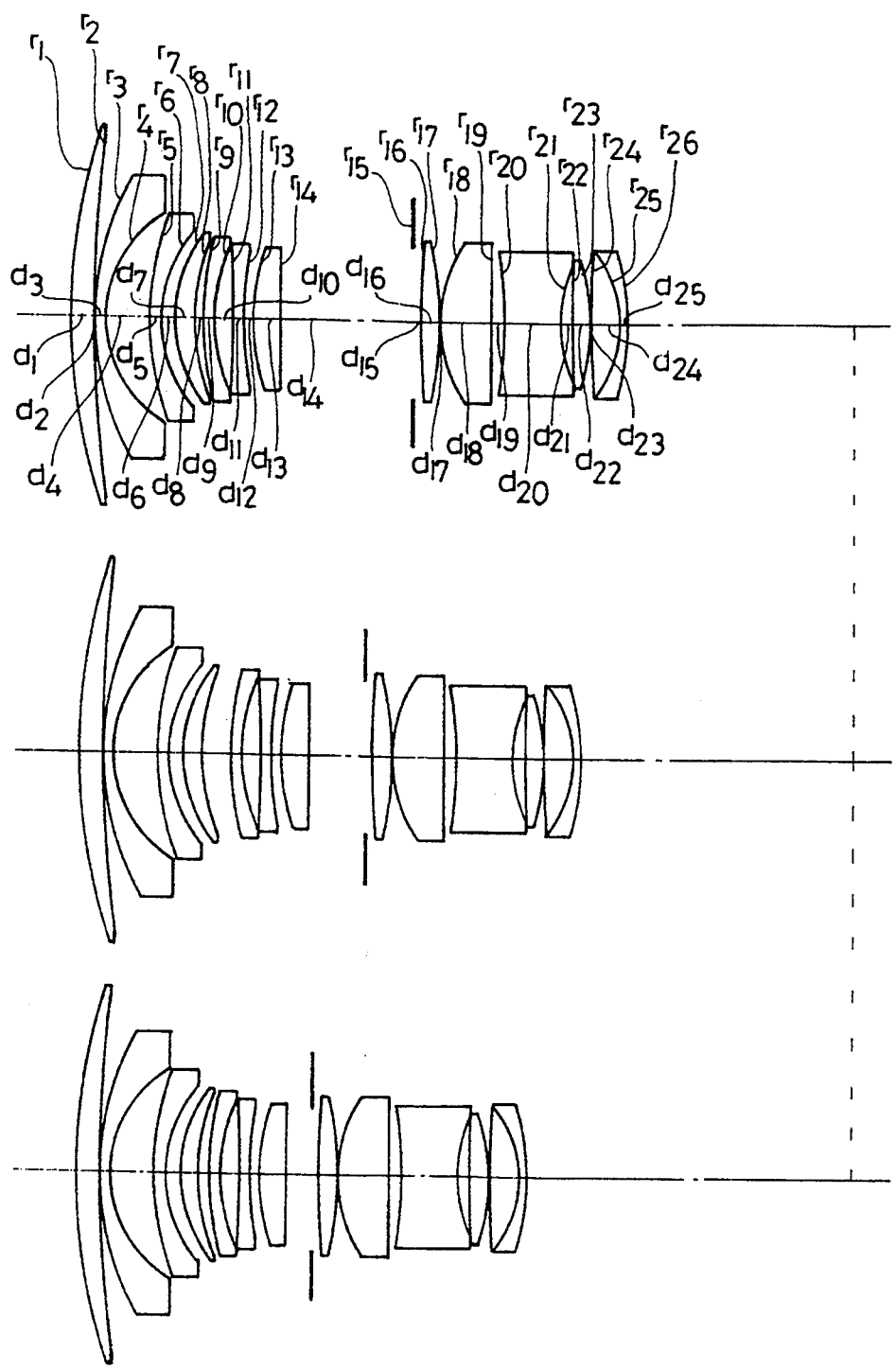

The second embodiment has a composition illustrated in FIG. 2, wherein the zoom lens system comprises, in order from the object side, a first lens unit having a negative refractive power, a second lens unit having a negative refractive power and a third lens unit having a positive refractive power. For zooming the zoom lens system preferred as the second embodiment, the first lens unit, the second lens unit and the third lens unit are moved so that an airspace reserved between the first lens unit and the second lens unit is once widened and then narrowed, and an airspace reserved between the second lens unit and the third lens unit is narrowed.

In the second embodiment, the first lens unit consists, in order from the object side, of a positive meniscus lens component having a convex surface on the object side, a negative meniscus lens component having a convex surface on the object side, a negative meniscus lens component having a convex surface on the object side and a positive meniscus lens component having a convex surface on the object side; the second lens unit consists, in order from the object side, of a negative meniscus lens component having a convex surface on the object side, a biconcave lens component and a plano-convex lens component having a convex surface on the object side; and the third lens unit consists, in order from the object side, of an aperture stop, a biconvex lens component, a plano-convex lens component having a convex surface on the object side, a biconcave lens component, a biconvex lens component, and a biconvex cemented doublet consisting of a biconvex lens element and a negative meniscus lens element.

The zoom lens system preferred as the second embodiment has a wide field angle of 93.7° at the wide position thereof, a large F number of 2.8 in the entire zooming range from the wide position to the tele position and a long back focal length.

Figure 9:
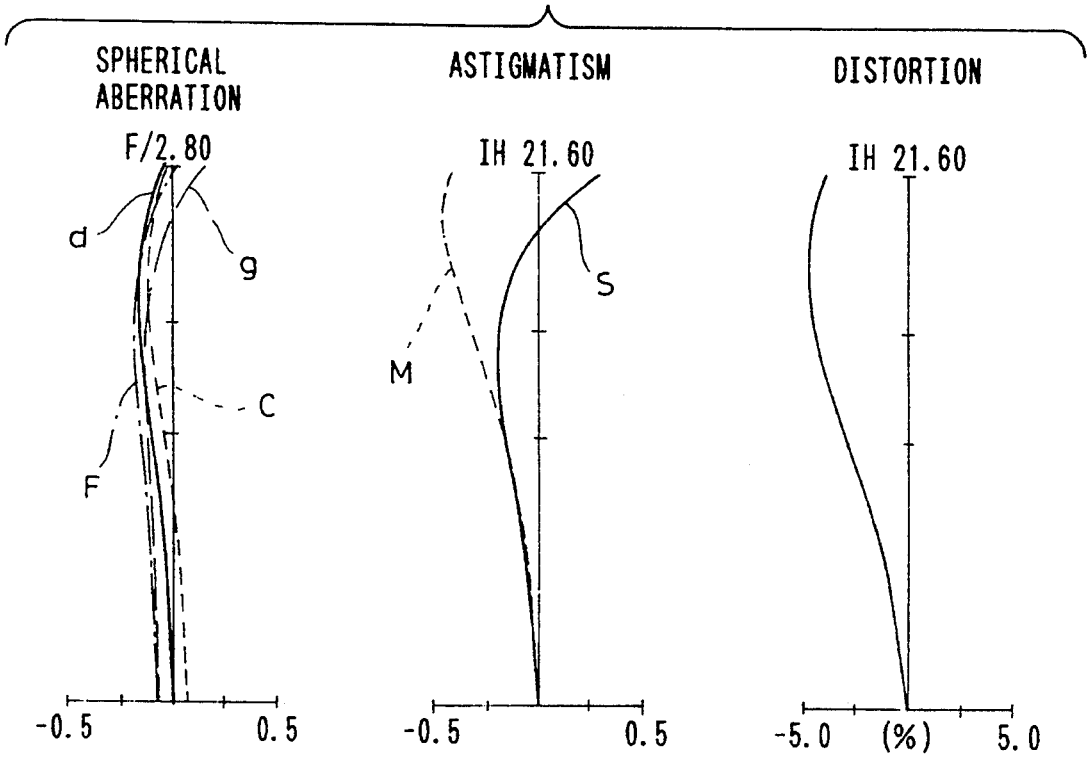
FIG. 9 shows curves illustrating aberration characteristics at the wide position of the second embodiment of the present invention.
Figure 10:
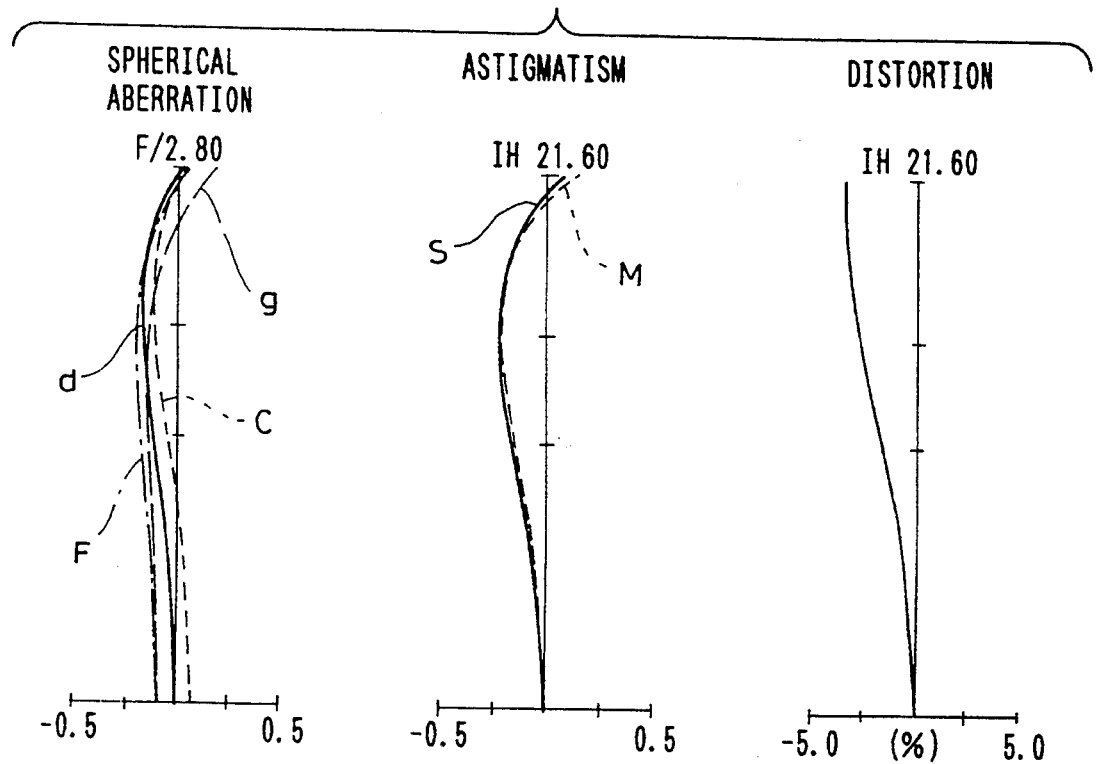
FIG. 10 shows curves illustrating aberration characteristics at the intermediate focal length of the second embodiment of the present invention.
Figure 11:
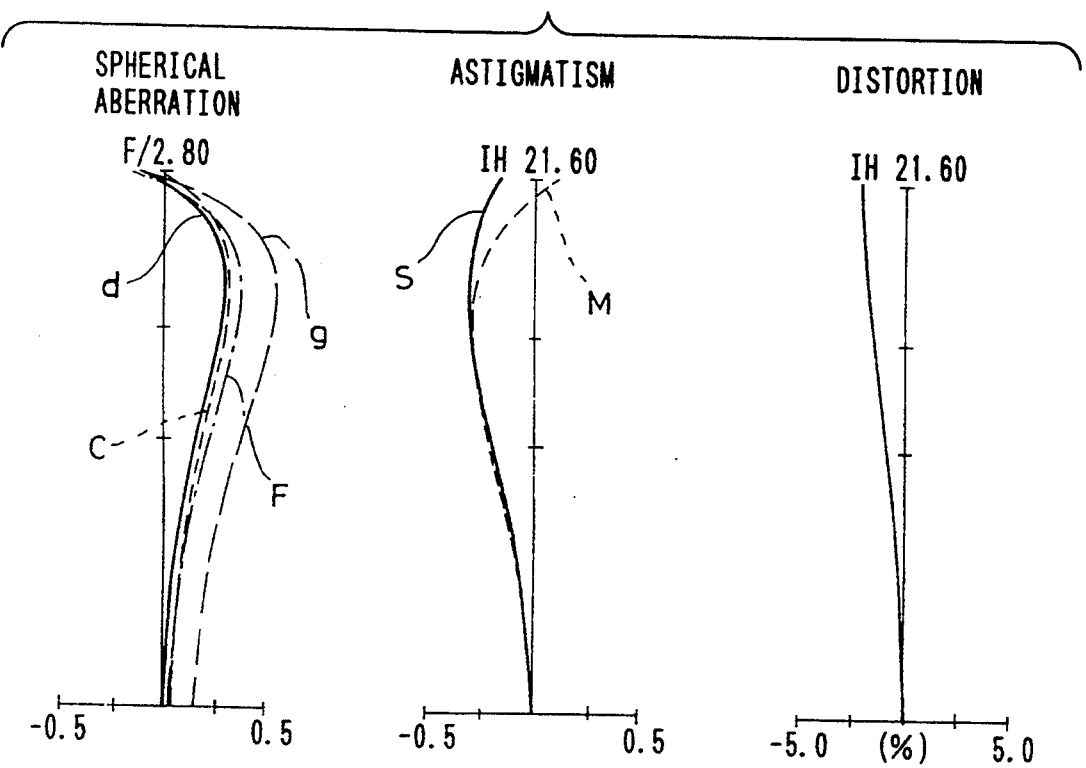
FIG. 11 shows curves illustrating aberration characteristics at the tele position of the second embodiment of the present invention.

Aberration characteristics of the second embodiment are illustrated in FIG. 9, FIG. 10 and FIG. 11.

Figure 3:
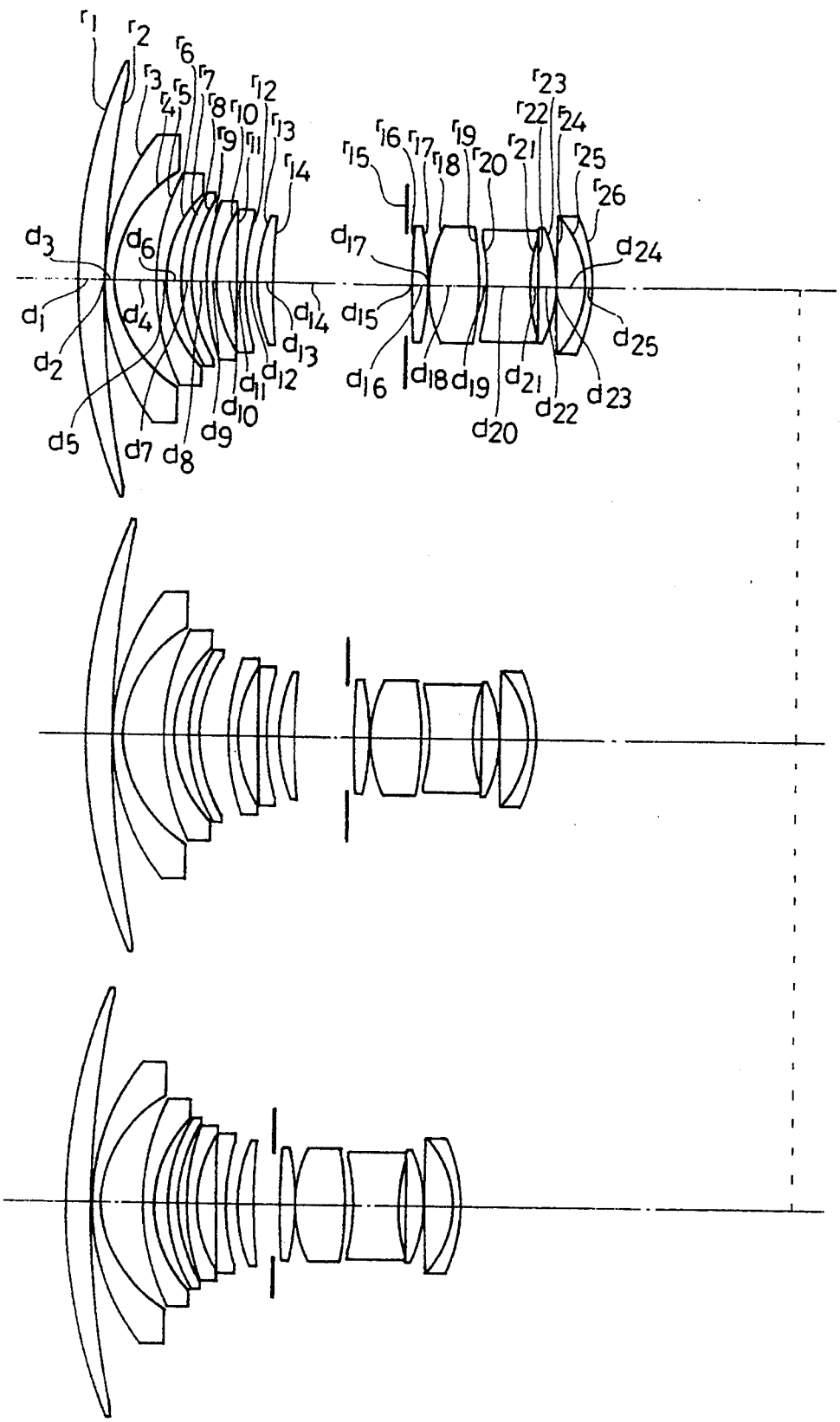

The third embodiment of the present invention has a composition shown in FIG. 3, wherein the zoom lens system comprises, in order from the object side, a first lens unit having a negative refractive power, a second lens unit having a negative refractive power and a third lens unit having a positive refractive power; and is zoomed by moving the first lens unit, the second lens unit and the third lens unit so that an airspace reserved between the first lens unit and the second lens unit is once widened and then narrowed, and an airspace reserved between the second lens unit and the third lens unit is narrowed. In the third embodiment, the first lens unit consists, in order from the object side, of a positive meniscus lens component having a convex surface on the object side, a negative meniscus lens component having a convex surface on the object side, a negative meniscus lens component having a convex surface on the object side and a positive meniscus lens component having a convex surface on the object side; the second lens unit consists, in order from the object side, of a negative meniscus lens component having a convex surface on the object side, a negative meniscus lens component having a convex surface on the object side and a positive meniscus lens component having a convex surface on the object side; and the third lens unit consists, in order from the object side, of an aperture stop, a biconvex lens component, a biconvex lens component, a biconcave lens component, a plano-convex lens component having a convex surface on the image side, and a biconvex cemented doublet consisting of a biconvex lens element and a meniscus lens element.

In the third embodiment, the second lens unit has a refractive power which is stronger than that of the second lens unit used in the first embodiment or the second embodiment, and a front principal point of the second lens unit is located nearer an image surface for prolonging a distance as measured between the principal points of the first lens unit and the second lens unit. Accordingly, a total refractive power of the first lens unit and the second lens unit is strengthened, whereby the third embodiment has a very wide field angle of 102.3° at the wide position thereof.

The third embodiment has the super-wide field angle as described above, a large F number of 2.8 over the entire zooming range from the wide position to the tele position and a long back focal length.

Figure 12:
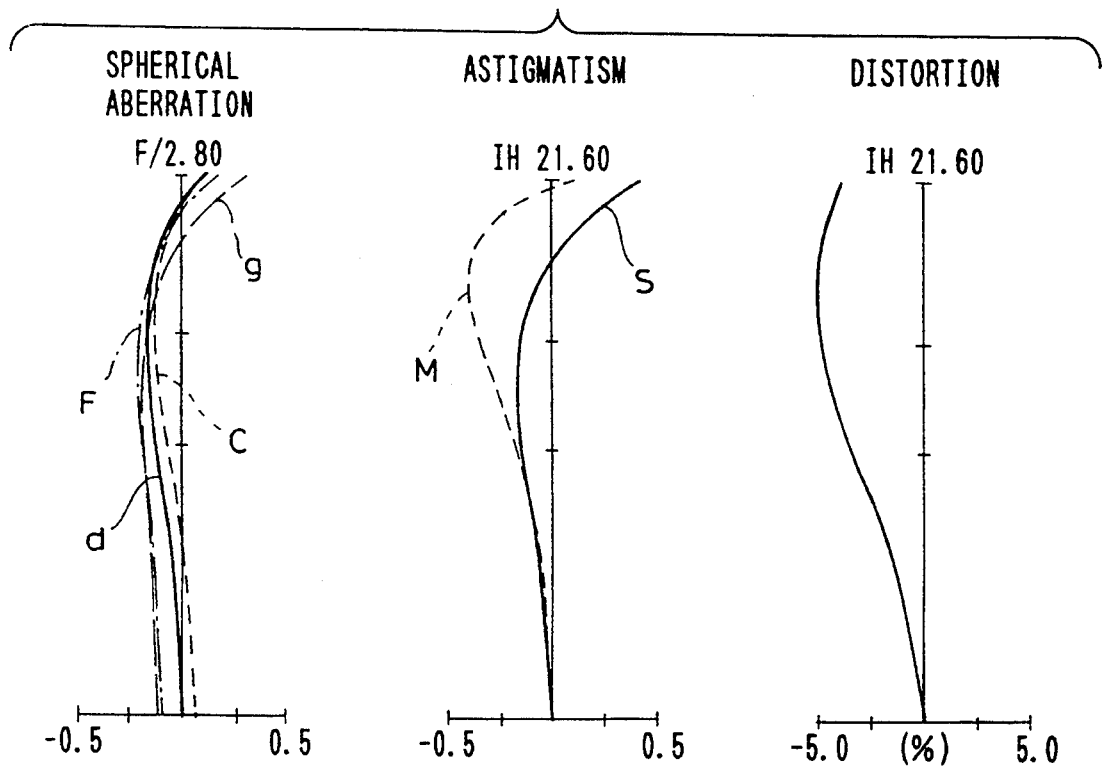
FIG. 12 shows graphs visualizing aberration characteristics at the wide position of the third embodiment of the present invention.
Figure 13:
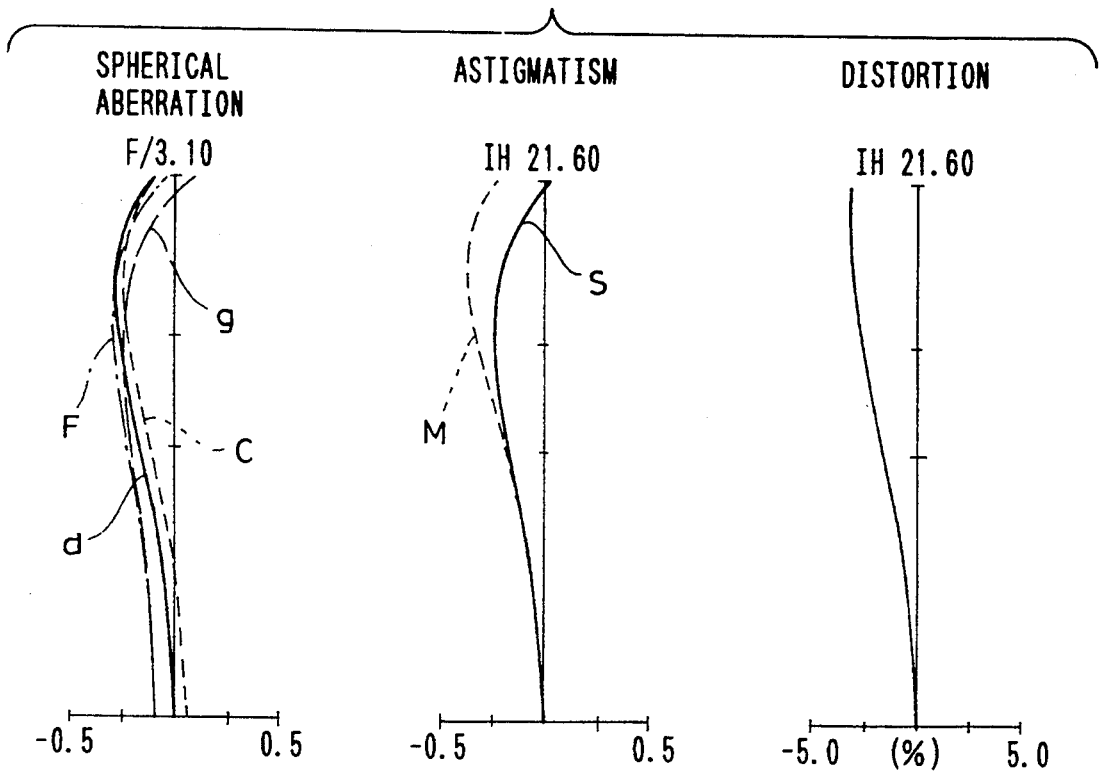
FIG. 13 shows graphs visualizing aberration characteristics at the intermediate focal length of the third embodiment of the present invention.
Figure 14:
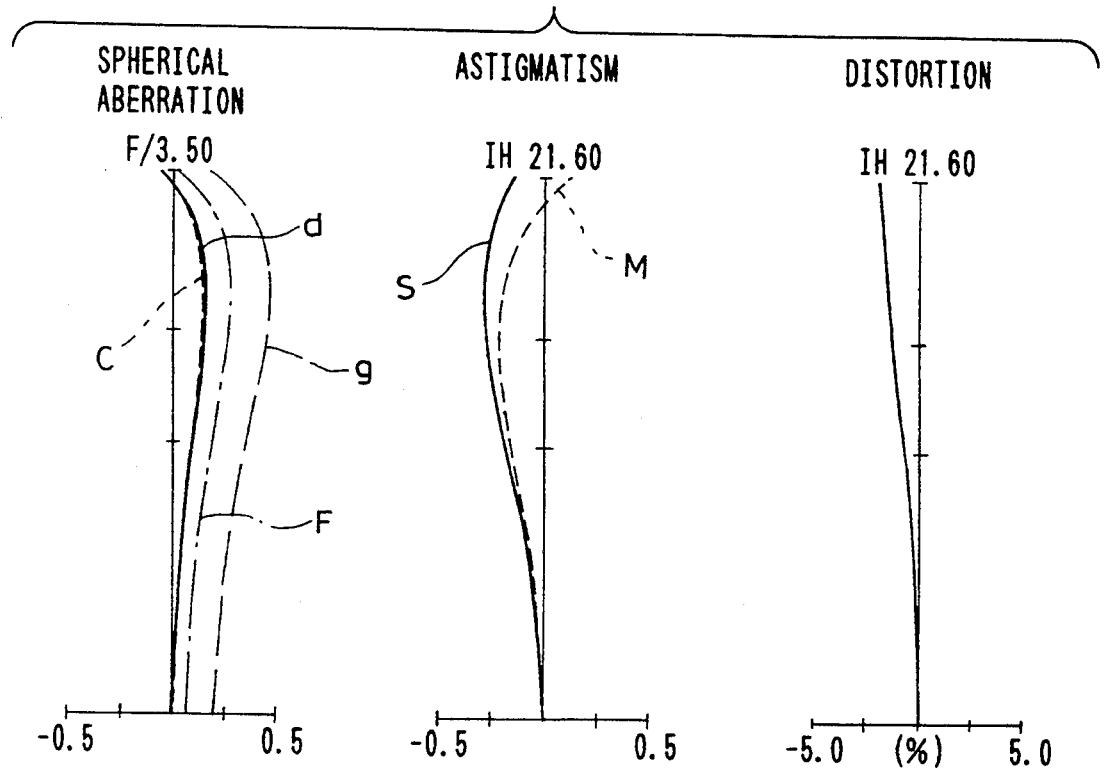
FIG. 14 shows graphs visualizing aberration characteristics at the tele position of the third embodiment of the present invention.

The third embodiment has aberrations which are corrected favorably as visualized in FIG. 12, FIG. 13 and FIG. 14.

Figure 4:
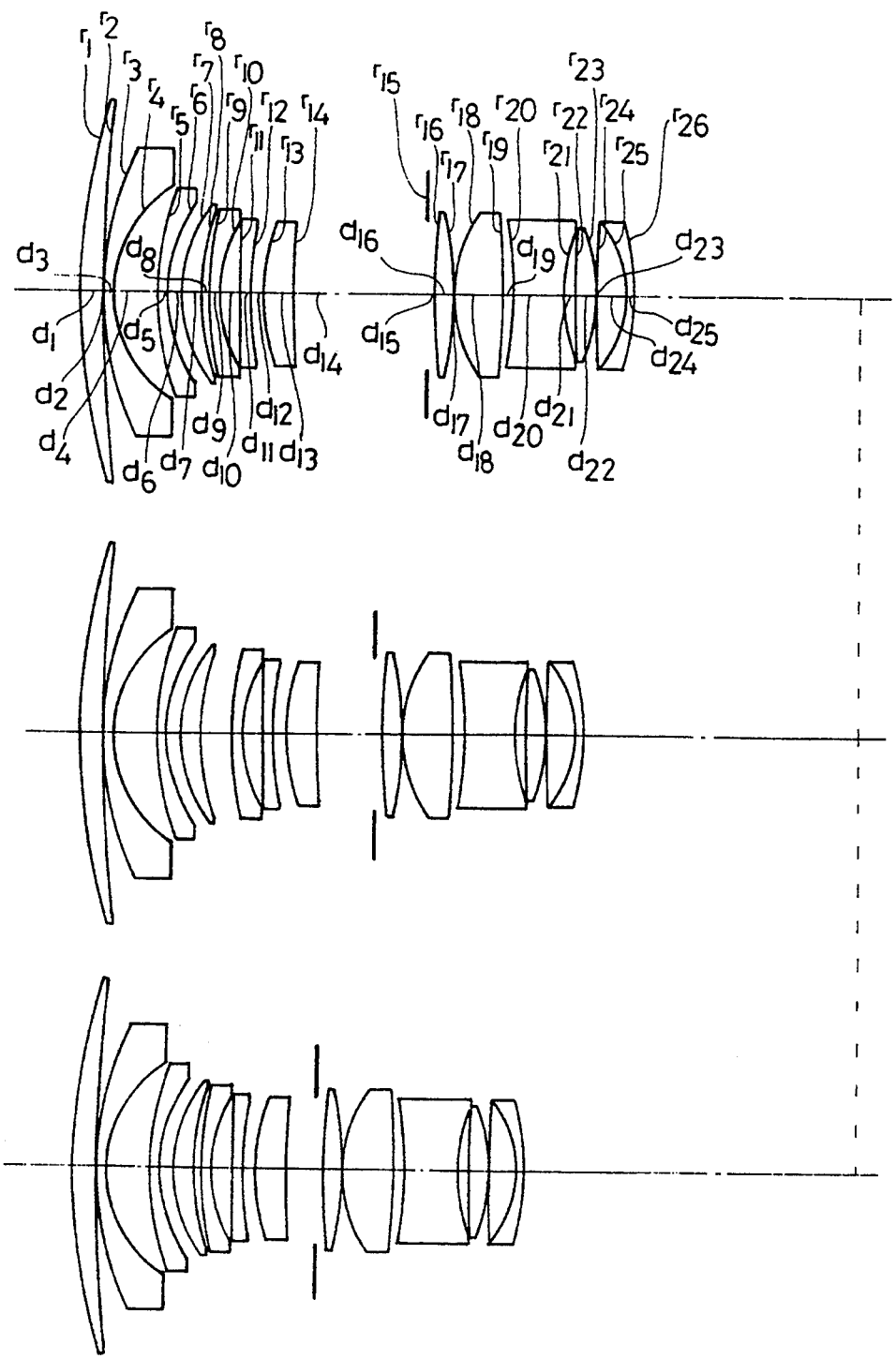

The fourth embodiment has a composition illustrated in FIG. 4, wherein the zoom lens system comprises, in order from the object side, a first lens unit having a negative refractive power, a second lens unit having a negative refractive power and a third lens unit having a positive refractive power; and is zoomed from the wide position to the tele position by moving, with the first lens unit kept fixed, the second lens unit and the third lens unit so that an airspace reserved between the first lens unit and the second lens unit is once widened and then narrowed, and an airspace reserved between the second lens unit and the third lens unit is narrowed.

In the fourth embodiment, the first lens unit consists, in order from the object side, of a positive meniscus lens component having a convex surface on the object side, a negative meniscus lens component having a convex surface on the object side, a negative meniscus lens component having a convex surface on the object side and a positive meniscus lens component having a convex surface on the object side; the second lens unit consists, in order from the object side, of a negative meniscus lens component having a convex surface on the object side, a negative meniscus lens component having a convex surface on the object side and a positive meniscus lens component having a convex surface on the object side; and the third lens unit consists, in order from the object side, of an aperture stop, a biconvex lens component, a biconvex lens component, a biconcave lens component, a biconvex lens component, and a biconvex cemented doublet consisting of a biconvex lens element and a meniscus lens element.

The zoom lens system preferred as the fourth embodiment is configured so as to have a total length which is kept constant at all focal lengths thereof over the entire zooming range from the wide position to the tele position by: equalizing an airspace reserved between the first lens unit and the second lens unit at the wide position to that reserved at the tele position; configuring the first lens unit and the second lens unit so as to have a total refractive power satisfying the formula (ii); by moving the third lens unit so as to satisfy the formula (i) for equalizing the total length of the zoom lens system at the wide position to that at the tele position; and moving the second lens unit and the third lens unit so as to satisfy the formula (iii) at all the focal lengths of the zoom lens system over the entire range from the wide position to the tele position.

The fourth embodiment has a wide field angle of 93.8° at the wide position, a large F number of 2.8 over the entire range from the wide position to the tele position and a long back focal length. Further, the fourth embodiment can use a simple mechanism for moving the lens units since the first lens unit is kept fixed over the entire range from the wide position to the tele position.

Figure 15:
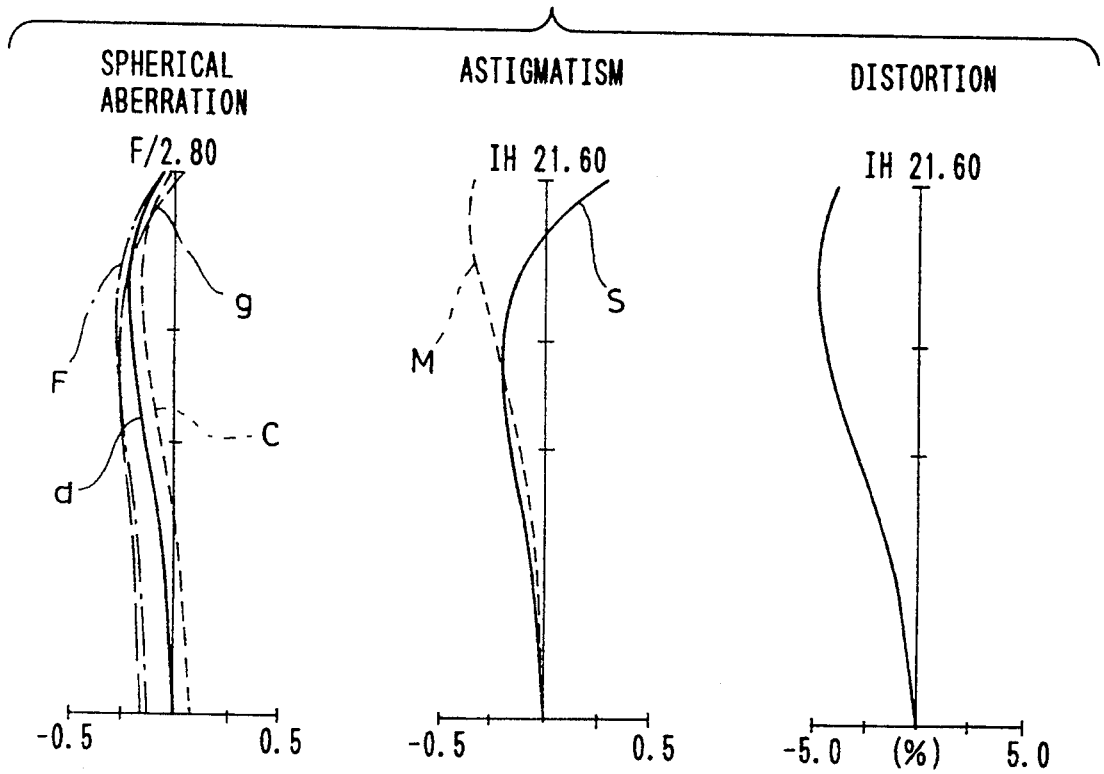
FIG. 15 shows curves visualizing aberration characteristics at the wide position of the fourth embodiment of the present invention.
Figure 16:
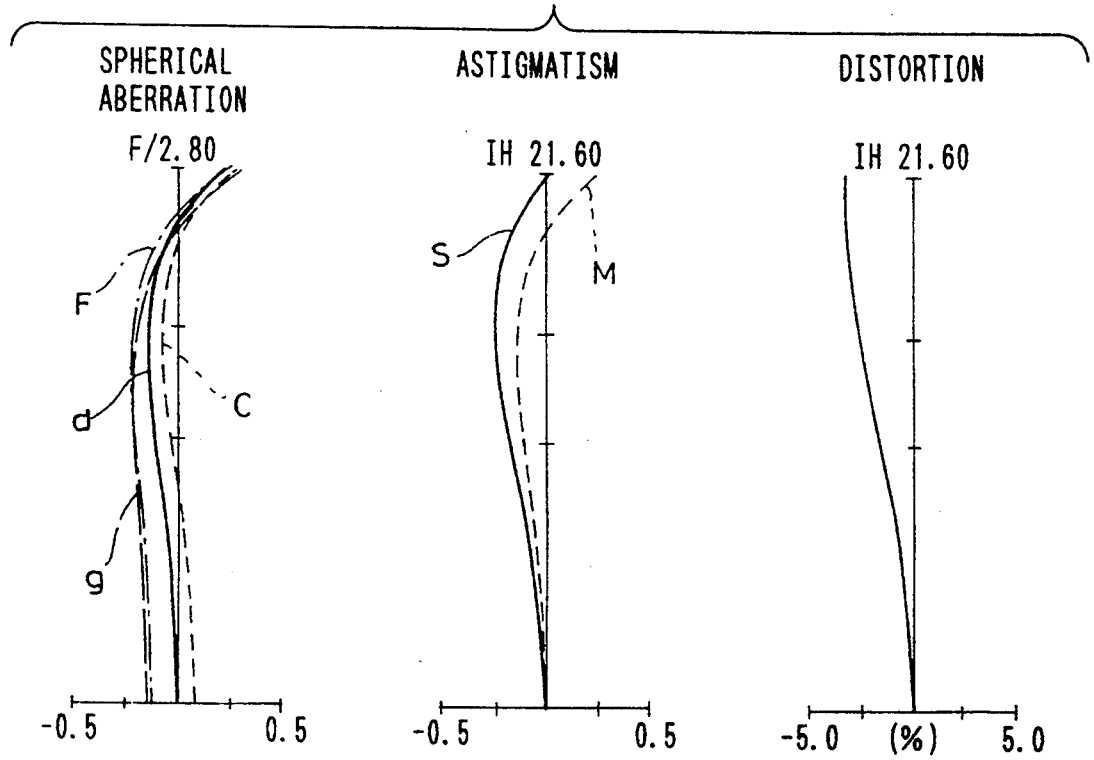
FIG. 16 shows curves visualizing aberration characteristics at the intermediate focal length of the fourth embodiment of the present invention.
Figure 17:
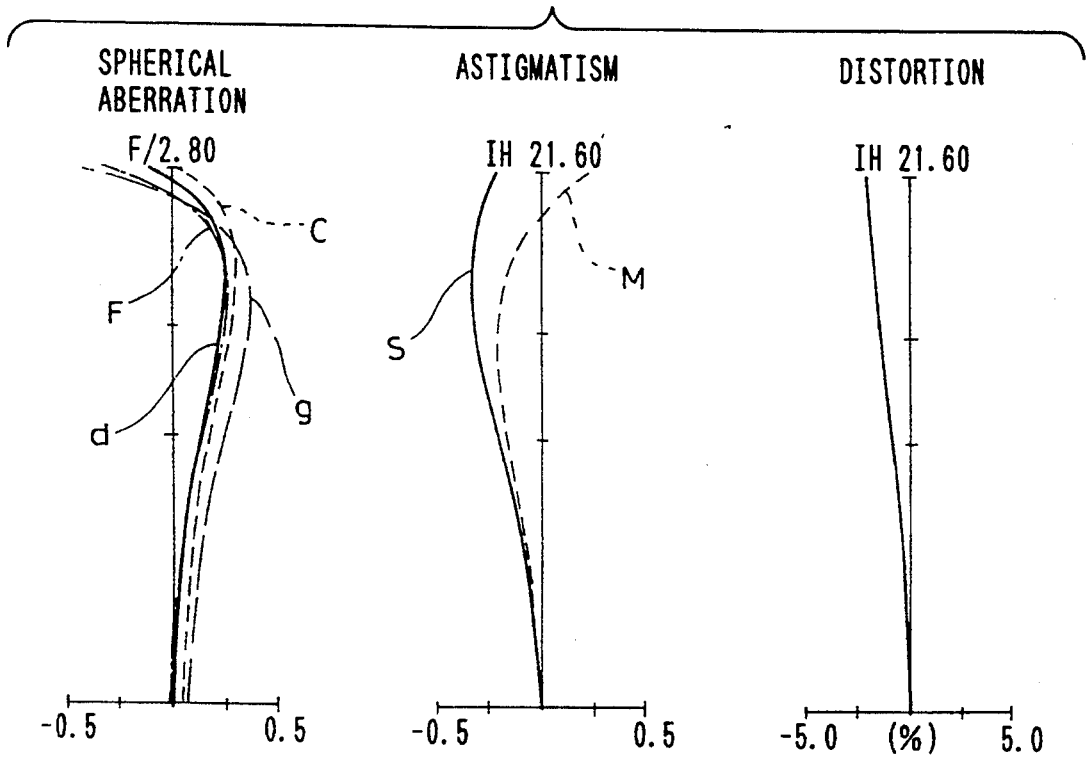
FIG. 17 shows curves visualizing aberration characteristics at the tele position of the fourth embodiment of the present invention.

The fourth embodiment has aberrations which are corrected favorably as illustrated in FIG. 15, FIG. 16 and FIG. 17.

Figure 5:
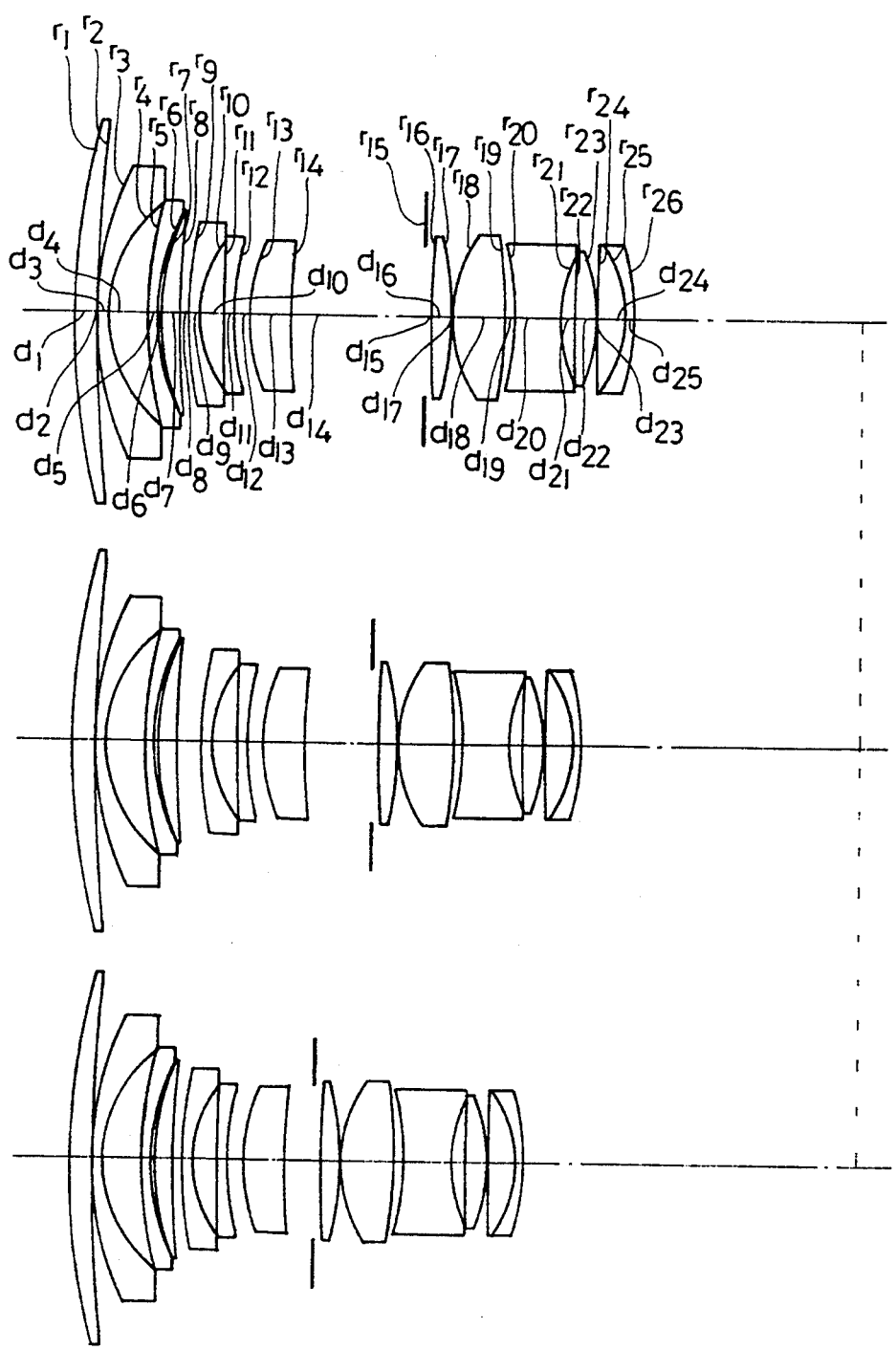

The fifth embodiment has a composition illustrated in FIG. 5, wherein the zoom lens system comprises, in order from the object side, a first lens unit having a negative refractive power, a second lens unit having a negative refractive power and a third lens unit having a positive refractive power; and is zoomed from the wide position to the tele position by moving the second lens unit and the third lens unit, with the first lens unit kept fixed, so that an airspace reserved between the first lens unit and the second lens unit is once widened and then narrowed, and an airspace reserved between the second lens unit and the third lens unit is narrowed.

In the fifth embodiment, the first lens unit consists, in order from the object side, of a positive meniscus lens component having a convex surface on the object side, a negative meniscus lens component having a convex surface on the object side, a negative meniscus lens component having a convex surface on the object side and a positive meniscus lens component having a convex surface on the object side; the second lens unit consists, in order from the object side, of a negative meniscus lens component having a convex surface on the object side, a negative meniscus lens component having a convex surface on the object side and a positive meniscus lens component having a convex surface on the object side; and the third lens unit consists, in order from the object side, of an aperture stop, a biconvex lens component, a biconvex lens component, a biconcave lens component, a biconvex lens component, and a biconvex cemented doublet consisting of a biconvex lens element and a meniscus lens element.

The fifth embodiment has, like the fourth embodiment, a total length at the wide position which is equalized to that the tele position by: equalizing the airspace reserved between the first lens unit and the second lens unit at the wide position to that reserved at the tele position, configuring the fist lens unit and the second lens unit so as to have a total refractive power satisfying the formula (ii); and moving the third lens unit so as to satisfy the formula (i). Further, the total length of the zoom lens system is kept unchanged at all focal lengths thereof over the entire range from the wide position to the tele position by moving the second lens unit and the third lens unit so as to satisfy the formula (iii) at focal lengths between a focal length at the wide position and that at the tele position.

The total length of the fifth embodiment is shortened by weakening the negative refractive power of the first lens unit and by strengthening the negative refractive power of the second lens unit, as compared with the refractive powers of the first lens unit and the second lens unit adopted for the fourth embodiment, so as to shift a rear principal point of the total system consisting of the first lens unit and the second lens unit toward the image surface, and by shifting a rear principal point of the third lens unit toward the image surface. Consequently, the total length of the fifth embodiment is the shortest of the total lengths of all the embodiments.

The fifth embodiment has a field angle as wide as 93.8° at the wide position, and nevertheless features a large F number of 2.8 over the entire zooming range from the wide position to the tele position and a long back focal length. Further, the fifth embodiment permits simplifying the mechanism for moving the lens units owing to the fact that the first lens unit is always kept fixed in the fifth embodiment.

Figure 18:
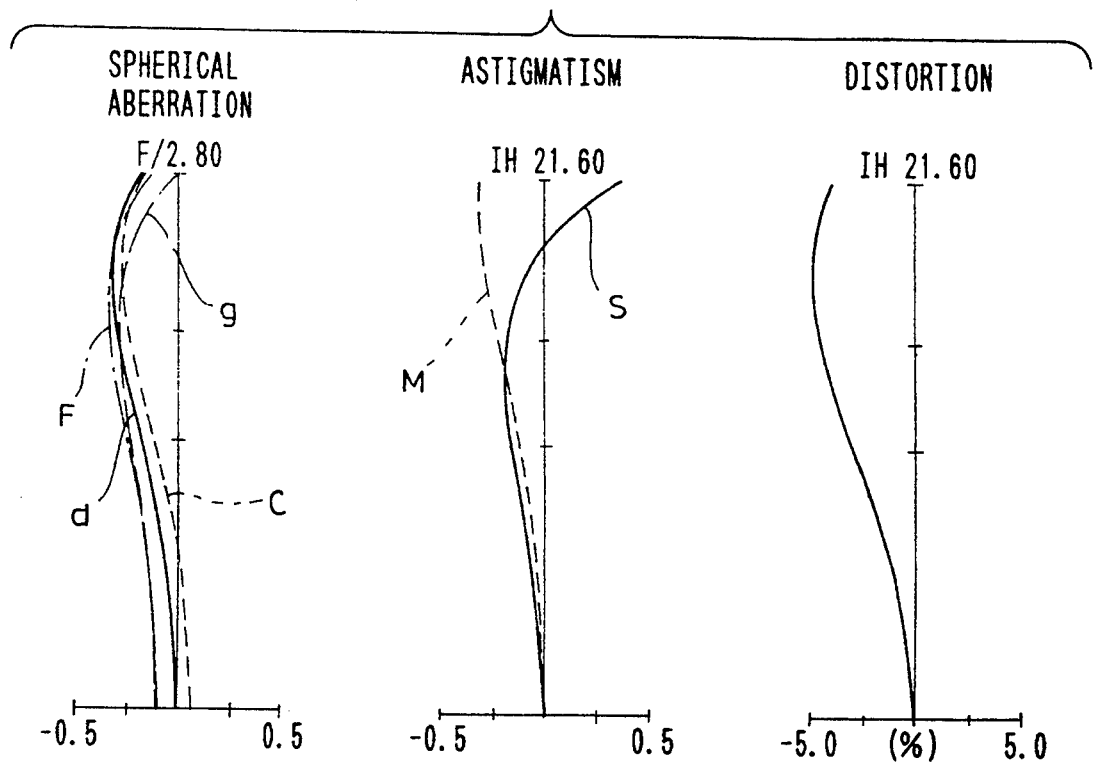
FIG. 18 shows graphs illustrating aberration characteristics at the wide position of the fifth embodiment of the present invention.
Figure 19:
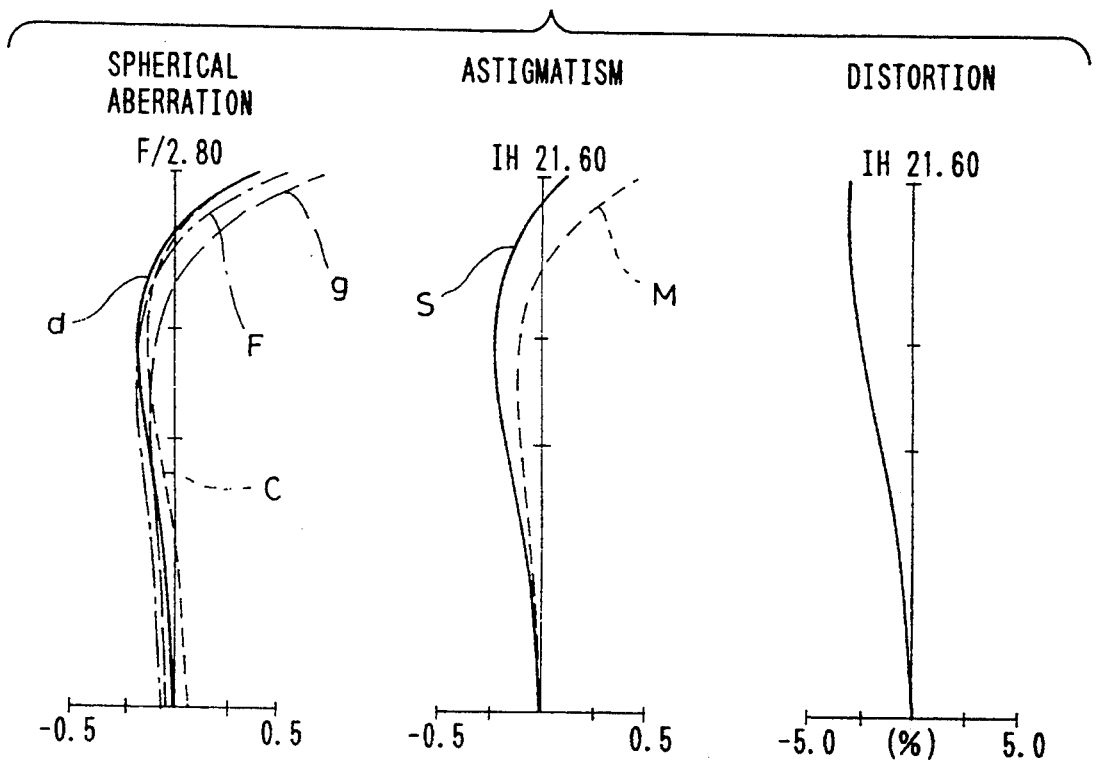
FIG. 19 shows graphs illustrating aberration characteristics at the intermediate focal length of the fifth embodiment of the present invention.
Figure 20:
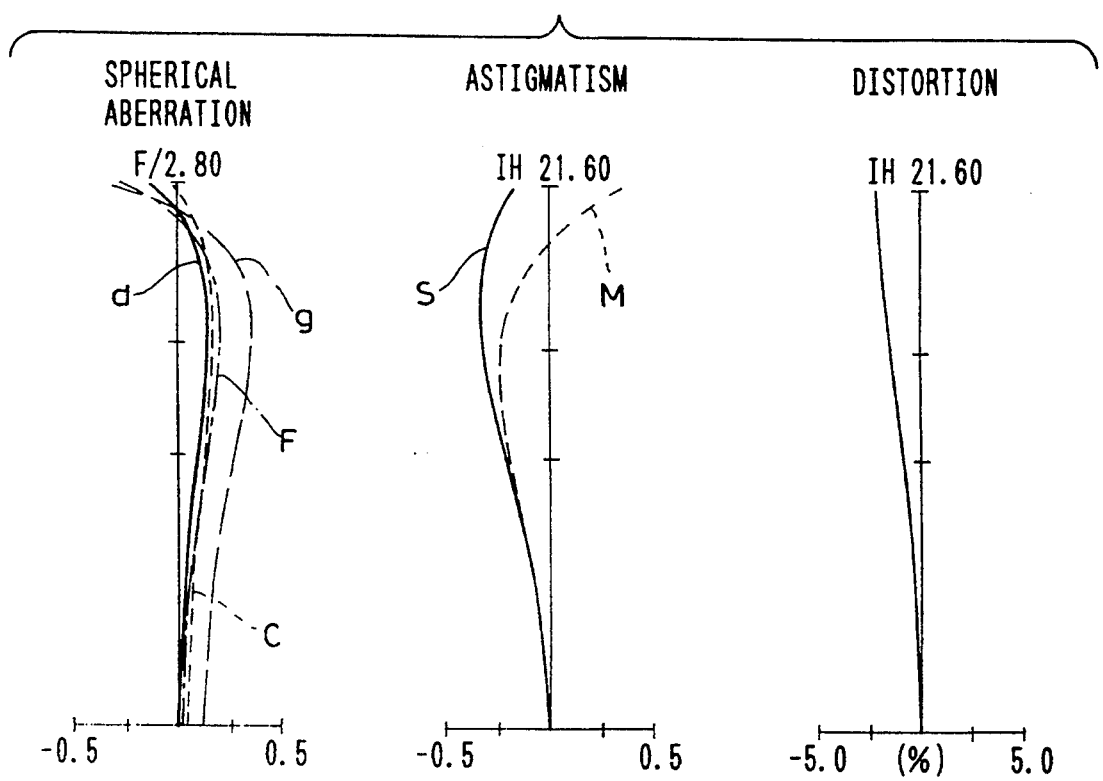
FIG. 20 shows graphs illustrating aberration characteristics at the tele position of the fifth embodiment of the present invention.

The fifth embodiment has aberrations which are corrected favorably as visualized in FIG. 18, FIG. 19 and FIG. 20.

As is understood from the foregoing description, the zoom lens system according to the present invention has a super-wide field angle within a range from 102° to 93°, a large F number of 2.8 at the wide position, a long back focal length and a relatively simple composition.

I claim:

1. A wide angle zoom lens system consisting of:
 a first lens unit having a negative refractive power disposed in an object side of said wide angle zoom lens system,
 a second lens unit having a negative refractive power disposed adjacent to said first lens unit on an image side of said first lens unit, and
 a third lens unit having a positive refractive power disposed adjacent to said second lens unit on an image side of said second lens unit,
 wherein a focal length of the wide angle zoom lens system as a whole is varied by changing a first airspace between said first lens unit and said second lens unit and a second airspace between said second lens unit and said third lens unit.

2. A wide angle zoom lens system comprising, in order from the object side:
 a first lens unit having a negative refractive power,
 a second lens unit having a negative refractive power, and
 a third lens unit having a positive refractive power,
 wherein a focal length of the wide angle zoom lens system as a whole is varied by moving at least said second and third lens units along an optical axis, and
 wherein when said zoom lens system is zoomed from a wide position to a tele position, a relative distance between said first lens unit and said second lens unit is once widened and then narrowed and a relative distance between said second lens unit and said third lens unit is narrowed.

3. A wide angle zoom lens system according to claim 2 wherein a distance as measured from the object side surface to an image surface of the zoom lens system at the wide position is equal to that at the tele position.

4. A wide angle zoom lens system according to claim 2 wherein said first lens unit is kept fixed for zooming and a distance as measured from the object side surface to an image surface of said zoom lens system is constant over the entire zooming range from the wide position to the tele position.

5. A wide angle zoom lens system according to claim wherein said first lens unit and said second lens unit satisfy the following conditions (1) and (2) respectively:

$$-3.0 < f_1/f_W < -1.0 \tag{1}$$

$$0.85 < f_2/f_1 \tag{2}$$

wherein the reference symbol $f_W$ represents a focal length of said zoom lens system as a whole at the wide angle position thereof, the reference symbol $f_1$ designates a focal length of said first lens unit and the reference symbol $f_2$ denotes a focal length of said second lens unit.

6. A wide angle zoom lens system according to claim wherein said first lens unit is kept fixed for zooming and satisfies the following condition (2'):

$$0.85 < f_2/f_1 < 3.5 \tag{2'}$$

7. A wide angle zoom lens system according to claim 5 or 6 wherein said first lens unit comprises, in order from the object side, a positive meniscus lens component having a convex surface on the object side, a negative meniscus lens component having a convex surface on the object side, a negative meniscus lens component having a convex surface on the object side and a positive meniscus lens component having a convex surface on the object side.

8. A wide angle zoom lens system according to claim 7 wherein said second lens unit comprises, in order from the object side, a negative meniscus lens component having a convex surface on the object side, a biconcave lens component and a positive meniscus lens component having a convex surface on the object side; and said third lens unit comprises, in order from the object side, an aperture stop, a biconvex lens component, a biconvex lens component, a biconcave lens component, a biconvex lens component, a biconvex cemented doublet consisting of a biconvex lens element and a negative meniscus lens element.

9. A wide angle zoom lens system according to claim 7 wherein said second lens unit comprises, in order from the object side, a negative meniscus lens component having a convex surface on the object side, a biconcave lens component and a plano-convex lens component having a convex surface on the object side; and the third lens unit comprises, in order from the object side, an aperture stop, a biconvex lens component, a plano-convex lens component having a convex surface on the object side, a biconcave lens component, a biconvex lens component and a biconvex cemented doublet consisting of a biconvex lens element and a negative meniscus lens element.

10. A wide angle zoom lens system according to claim 7 wherein said second lens unit comprises, in order from the object side, a negative meniscus lens component having a convex surface on the object side, a negative meniscus lens component having a convex surface on the object side and a positive meniscus lens component having a convex surface on the object side; and said third lens unit comprises, in order from the object side, an aperture stop, a biconvex lens component, a biconvex lens component, a biconcave lens component, a plano-convex lens component having a convex surface on the image side, and a biconvex cemented doublet consisting of a biconvex lens element and a meniscus lens element.

11. A wide angle zoom lens system comprising, in order from the object side:
   a first lens unit having a negative refractive power,
   a second lens unit having a negative refractive power, and
   a third lens unit having a positive refractive power,
   wherein said first lens unit comprises a positive meniscus lens component having a convex surface on the object side and two negative meniscus lens components having convex surfaces respectively on the object side.

12. A wide angle zoom lens system according to claim 11 wherein said second lens unit comprises, in order from the object side, a negative meniscus lens component having a convex surface on the object side, a negative lens component and a positive meniscus lens component having a convex surface on the object side; and said third lens unit comprises, in order from the object side, two positive lens components, a biconcave lens component, a positive lens component and a biconvex cemented doublet.

* * * * *